United States Patent
Singh et al.

(10) Patent No.: US 12,537,535 B2
(45) Date of Patent: Jan. 27, 2026

(54) SYMMETRICAL RESISTIVE HARMONIC REJECTION MIXER (HRM)

(71) Applicant: QUALCOMM Incorporated, San Diego, CA (US)

(72) Inventors: Rahul Singh, San Diego, CA (US); Mehran Bakhshiani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 637 days.

(21) Appl. No.: 17/934,467

(22) Filed: Sep. 22, 2022

(65) Prior Publication Data
US 2024/0106445 A1   Mar. 28, 2024

(51) Int. Cl.
| | |
|---|---|
| *H03L 7/20* | (2006.01) |
| *H03D 7/16* | (2006.01) |
| *H04B 1/00* | (2006.01) |
| *H04B 1/26* | (2006.01) |

(52) U.S. Cl.
CPC .............. *H03L 7/20* (2013.01); *H03D 7/165* (2013.01); *H04B 1/0096* (2013.01); *H04B 1/26* (2013.01)

(58) Field of Classification Search
CPC ........ H03L 7/20; H03D 7/165; H04B 1/0096; H04B 1/26
See application file for complete search history.

(56) References Cited

U.S. PATENT DOCUMENTS

| | | | |
|---|---|---|---|
| 2011/0306300 A1 | 12/2011 | Behera et al. | |
| 2012/0019305 A1* | 1/2012 | Zhang | H03D 7/125 327/355 |
| 2013/0300489 A1* | 11/2013 | Mishra | H03D 7/1483 327/355 |
| 2014/0364076 A1 | 12/2014 | Cha et al. | |
| 2015/0084683 A1* | 3/2015 | Kumagawa | H03D 7/1441 327/361 |
| 2016/0126894 A1 | 5/2016 | Lakdawala et al. | |

(Continued)

OTHER PUBLICATIONS

Cha H-K., et al., "A CMOS Wideband RF Front-End with Mismatch Calibrated Harmonic Rejection Mixer for Terrestrial Digital TV Tuner Applications", IEEE Transactions on Microwave Theory and Techniques, IEEE, USA, vol. 58, No. 8, Aug. 1, 2010, pp. 2143-2151, XP011313838, Paragraph C. HRM, figure 5.

(Continued)

*Primary Examiner* — Raymond S Dean
(74) *Attorney, Agent, or Firm* — Norton Rose Fulbright US LLP

(57) ABSTRACT

This disclosure provides systems, methods, and devices for wireless communications that support downconversion of signals with improved harmonic rejection. In a first aspect, an apparatus includes a first plurality of mixers with each mixer coupled to two oscillating signals that are 180 degrees apart in phase; a second plurality of mixers with each mixer coupled to two oscillating signals that are 180 degrees apart in phase, wherein a combined load of the first plurality of mixers and the second plurality of mixers on the plurality of oscillating signals is symmetric as to each oscillating signal of the plurality of oscillating signals; and a shared capacitor coupling the RF input to the first plurality of mixers and the second plurality of mixers. Other aspects and features are also claimed and described.

20 Claims, 11 Drawing Sheets

(56) References Cited

U.S. PATENT DOCUMENTS

| | | |
|---|---|---|
| 2016/0261298 A1 | 9/2016 | Seendripu et al. |
| 2016/0285567 A1 | 9/2016 | Alam et al. |
| 2017/0238312 A1* | 8/2017 | Chen .................... H04L 1/1812 370/329 |
| 2019/0068266 A1* | 2/2019 | Chang .................. H04L 5/0048 |
| 2022/0085762 A1* | 3/2022 | Delos .................. H03D 7/1475 |

OTHER PUBLICATIONS

International Search Report and Written Opinion—PCT/US2023/072486—ISA/EPO—Jan. 9, 2024.

Choke T Y., et al., "A Multiband Mobile Analog TV Tuner SoC With 78-dB Harmonic Rejection and GSM Blocker Detection in 65-nm CMOS", IEEE Journal of Solid-State Circuits, vol. 48, No. 5, May 2013, pp. 1174-1187.

El-Aassar O., et al., "A 16 Path All-Passive Harmonic Rejection Mixer with Watt-Level In-Band IIP3 in 45-nm CMOS SOI", IEEE Microwave and Wireless Components Letters, vol. 30, No. 8, Aug. 2020, pp. 790-793.

Kibaroglu K., et al., "A 0.05-6 GHz Voltage-Mode Harmonic Rejection Mixer with up to 30 dBm In-Band IIP3 and 35 dBc HRR in 32 nm SOI CMOS", 2017 IEEE Radio Frequency Integrated Circuits Symposium, 2017, pp. 304-307.

* cited by examiner

SYMMETRICAL RESISTIVE HARMONIC REJECTION MIXER (HRM)

TECHNICAL FIELD

Aspects of the present disclosure relate generally to wireless communication systems, and more particularly, to radio frequency (RF) processing circuitry for wireless communication systems. Some features may enable and provide improved communications, including improved operation of RF transceivers, such as improved harmonic rejection in mixers.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Modern wireless communication networks are sophisticated networks that involve operation on multiple frequencies and multiple frequency ranges. RF signals in different frequencies and ranges may use different components or different configurations of components to support a device operating on these wireless communication networks and maintain high signal integrity and high bandwidth across a range of possible network conditions. The duplication of components and number of supported configurations presents challenges in designing RF systems for the UEs and BS s operating on wireless communication networks.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The number of different signals present in a modern RF circuit, such as in a wireless communication device, and the number of different frequencies of those signals can create unexpected interference between the different signals. Example embodiments of RF signal chain are shown in figures herein, and alternative configurations for those embodiments are described in the description herein. One example interference occurs in a carrier aggregation configuration involving a first band and a second band in which the second band is at a frequency that is three times the frequency of the first band. For example, if a receiver is observing the first band (Band 1) power amplifier output while the second band (Band 2) power amplifier is transmitting in a high-power mode, leakage paths through finite antenna isolation will enable the second band signal to reach the RF signal input with enough amplitude such that after down-conversion by the third local oscillator (LO) harmonic, the quality of the signal is reduced.

Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described herein may present other benefits than, and be used in other applications than, those described above.

The interference between signals in a transceiver may be addressed through one or more of the solutions described herein. In some aspects, separate I- and Q-channel paths may be configured to be symmetric, such as with a combined load from mixers coupled to the same LO phase being approximately equal between LO phases. In some aspects, gain scaling is provided through a bank of configurable resistors to achieve HRM gain scaling for a desired mode of operation with a reconfigurable front-end (e.g., for example between LNA bypass mode or LNA mode). In some aspects, a shared capacitor between an RF input and both of the I- and Q-channel mixers is provided to obtain an HRM gain scaling that is a ratio of the configurable resistors, with smaller or no dependency on the input impedance, which would not be the case if separate capacitors for the I- and Q-channel paths were implemented In one aspect of the disclosure, an apparatus for wireless communication (e.g., a user equipment (UE) or a base station (BS)) includes a radio frequency (RF) input node for receiving an antenna signal; a plurality of oscillating signal input nodes configured to receive a plurality of oscillating signals, wherein each oscillating signal of the plurality of oscillating signals is out of phase with other oscillating signals of the plurality of oscillating signals; a first plurality of mixers, wherein each mixer of the first plurality of mixers is coupled to two oscillating signals of the plurality of oscillating signals that are 180 degrees apart in phase; a second plurality of mixers, wherein each mixer of the second plurality of mixers is coupled to two oscillating signals of the plurality of oscillating signals that are 180 degrees apart in phase, wherein a combined load of the first plurality of mixers and the second plurality of mixers on the plurality of oscillating signals is symmetric as to each oscillating signal of the plurality of oscillating signals; and a capacitor coupling the RF input node to the first plurality of mixers and the second plurality of mixers.

In an additional aspect of the disclosure, a method for wireless communication includes applying a radio frequency (RF) input signal to a first plurality of mixers and a second plurality of mixers through a shared capacitor; applying a plurality of oscillating signals to the first plurality of mixers, wherein each mixer of the first plurality of mixers is coupled to two oscillating signals of the plurality of oscillating signals that are 180 degrees apart in phase; and applying the plurality of oscillating signals to a second plurality of mixers, wherein each mixer of the second plurality of mixers is coupled to two oscillating signals of the plurality of oscillating signals that are 180 degrees apart in phase, wherein a combined load of the first plurality of mixers and the second plurality of mixers on the plurality of oscillating signals is symmetric as to each oscillating signal of the plurality of oscillating signals.

In a further aspect of the disclosure, an apparatus for wireless communications includes a radio frequency (RF) input node configured to receive an RF input signal; at least four first mixer circuits coupled between the RF input node and an in-phase output node, each of the at least four first mixer circuits configured to receive the RF input signal and configured to receive two local oscillator (LO) signals of a plurality of LO signals, wherein each LO signal of the plurality of LO signals is out of phase relative to other LO signals of the plurality of LO signals, and wherein the two LO signals are 180 degrees apart in phase; at least four second mixer circuits coupled between the RF input node and a quadrature output node, each of the at least four second mixer circuits configured to receive the RF input signal and configured to receive two LO signals of the plurality of LO signals, wherein the two LO signals are 180 degrees apart in phase; a capacitor coupled between the RF input node and each of the at least four first mixer circuits and each of the at least four second mixer circuits; a first plurality of resistors coupled between the capacitor and the at least four first mixer circuits; and a second plurality of resistors coupled between the capacitor and the at least four second mixer circuits.

In an additional aspect of the disclosure, a harmonic rejection mixer (HRM) includes an radio frequency (RF) input; a first set of in-phase mixers; a second set of quadrature-phase mixers; a second set of two IF outputs; wherein each of the two RF input nodes of each of the second set of four (4) double-balanced mixers is coupled via a different resistor of the second set of eight (8) configurable resistors to the RF input, and wherein each of the two LO input nodes of each of the second set of four (4) double-balanced mixers is coupled via a different one of the eight (8) LO phases, wherein each of the second set of two IF outputs is coupled to a different one of the two IF output nodes of all of the second set of four (4) double-balanced mixers, wherein a resistance value of at least one of the first set of eight (8) configurable resistors, coupled to a first RF input node of a respective one of the first set of four (4) double-balanced mixers to which a first phase of the eight (8) LO phases is supplied, is configured differently from a resistance value of a respective one of the second set of eight (8) resistors coupled to a second RF input node of a respective one of the second set of four (4) double-balanced mixers to which a second phase of the same eight (8) LO phases is supplied, wherein the first phase of the eight (8) LO phases and the second phase of the same eight (8) LO phases are subsequent phases from the eight (8) LO phases. The first set of in-phase mixers may include a first set of eight (8) configurable resistors; a first set of four (4) double-balanced mixers, each double-balanced mixer comprising two RF input nodes, two local oscillator (LO) input nodes, and two intermediate frequency (IF) output nodes; a first set of two IF outputs; wherein each of the two RF input nodes of each of the first set of four (4) double-balanced mixers is coupled via a different resistor of the first set of eight (8) configurable resistors to the RF input, wherein each of the two LO input nodes of each of the first set of four (4) double-balanced mixers is supplied with a different one of eight (8) LO phases, and wherein each of the first set of two IF outputs is coupled to a different one of the two IF output nodes of all of the first set of four (4) double-balanced mixers. The second set of quadrature-phase mixers includes a second set of eight (8) configurable resistors; and a second set of four (4) double-balanced mixers, each comprising two RF input nodes, two LO input nodes, and two IF output nodes.

In an additional aspect of the disclosure, an apparatus includes means for applying a radio frequency (RF) input signal to a first plurality of mixers and a second plurality of mixers through a shared capacitor; means for applying a plurality of oscillating signals to the first plurality of mixers, wherein each mixer of the first plurality of mixers is coupled to two oscillating signals of the plurality of oscillating signals that are 180 degrees apart in phase; and means for applying the plurality of oscillating signals to a second plurality of mixers, wherein each mixer of the second plurality of mixers is coupled to two oscillating signals of the plurality of oscillating signals that are 180 degrees apart in phase, wherein a combined load of the first plurality of mixers and the second plurality of mixers on the plurality of oscillating signals is symmetric as to each oscillating signal of the plurality of oscillating signals.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
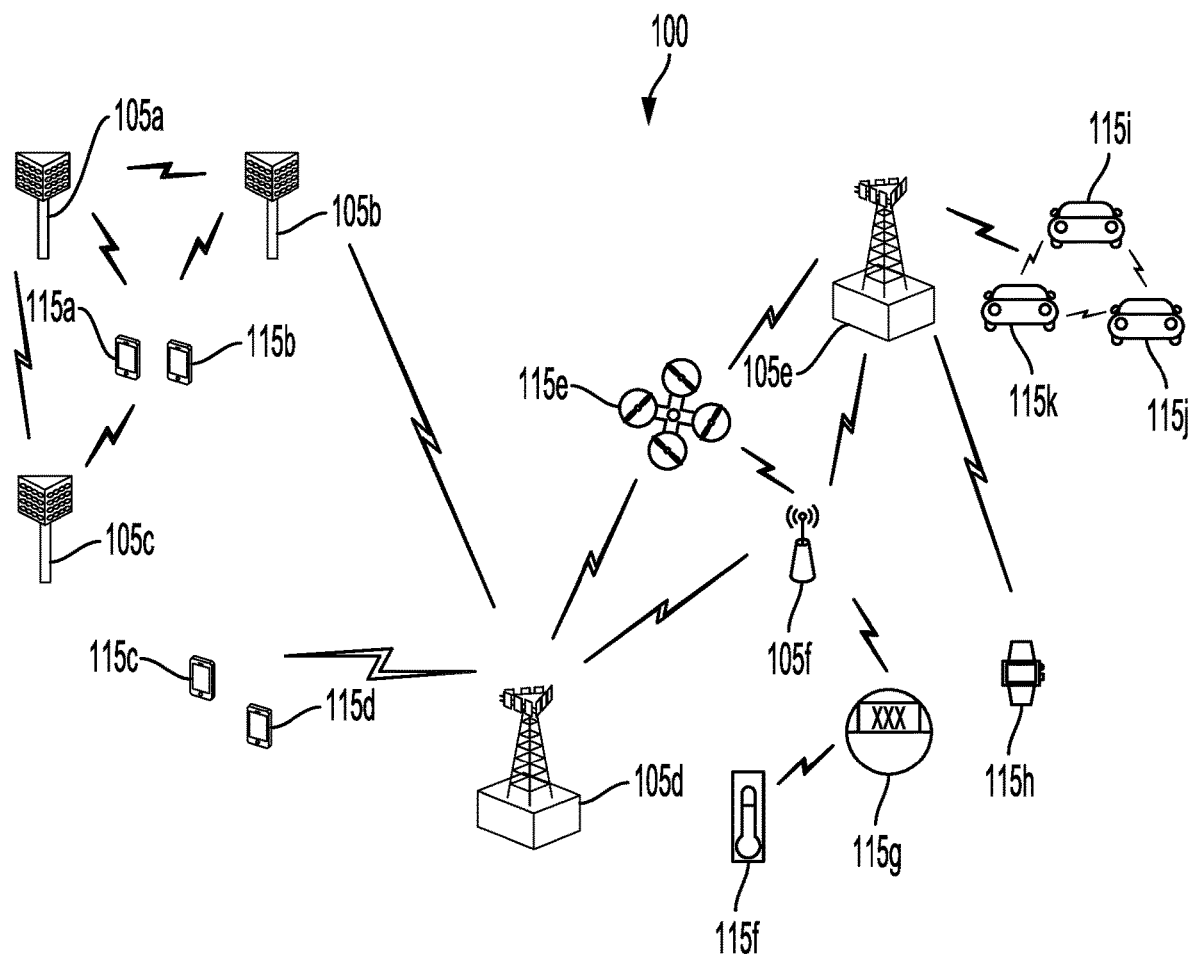
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support wireless communications, including techniques for downconverting a signal from a first, higher frequency to a second, lower frequency. This disclosure describes embodiments of a RF signal chain comprising one or more harmonic rejection mixer (HRM). The HRM may be a resistive HRM with resistive scaling provided through banks of variable resistors in the RF signal chain. In some embodiments, the RF signal chain includes a downconverting mixer configured as an 8-phase HRM, which is symmetrical with respect to one or more of the local oscillator (LO), radio frequency (RF), and/or intermediate frequency (IF) ports of the mixer. In some embodiments, configurable resistors are coupled to a capacitor shared between I- and Q-channel paths. Aspects of embodiments may be used in complex I-Q receiver and feedback receiver (FBRX) architectures (e.g., with reconfigurable mixer configurations between LNA, LNA-bypass, and mixer-first) provided, in part, by the HRM scaling being configurable independent of the source impedance.

Particular implementations of the subject matter described in this disclosure may be implemented to realize one or more of the following potential advantages or benefits. A resistive HRM as in embodiments described herein, variable resistances coupled between the input source and the mixers provide isolation between the HRM phases to achieve an acceptable third-harmonic rejection ratio (HRR3) of at least 30-50 dBc without calibration overhead. The variable resistances may be adjusted based on a LO frequency used for downconverting the RF input signal. In some aspects, the present disclosure provides techniques for operating a RF signal chain driven, at least in part, from a 25% duty cycle local oscillator (LO) signal, which reduces power consumption (e.g., such as when compared to use of a 12.5% LO in other downconverting mixers). Embodiments of the disclosed downconverting HRM are measured to provide third harmonic rejection ratio (HRR3) of up to or more than 35-40 dBc without any calibration over 0.6 G-7.125 G for us in 2G/3G/4G/5G communications bands. Further, the measurements indicate good image rejection ratio (IRR) for embodiments implementing IQ symmetry with up to or more than 40 dBc without any calibration, which may be provided, in part, by the symmetrical design and layout in certain HRM embodiments.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably. A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long-term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology.

Additionally, one or more aspects of the present disclosure may be related to shared access to wireless spectrum between networks using different radio access technologies or radio air interfaces. 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band. 5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution. FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.). Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100. A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
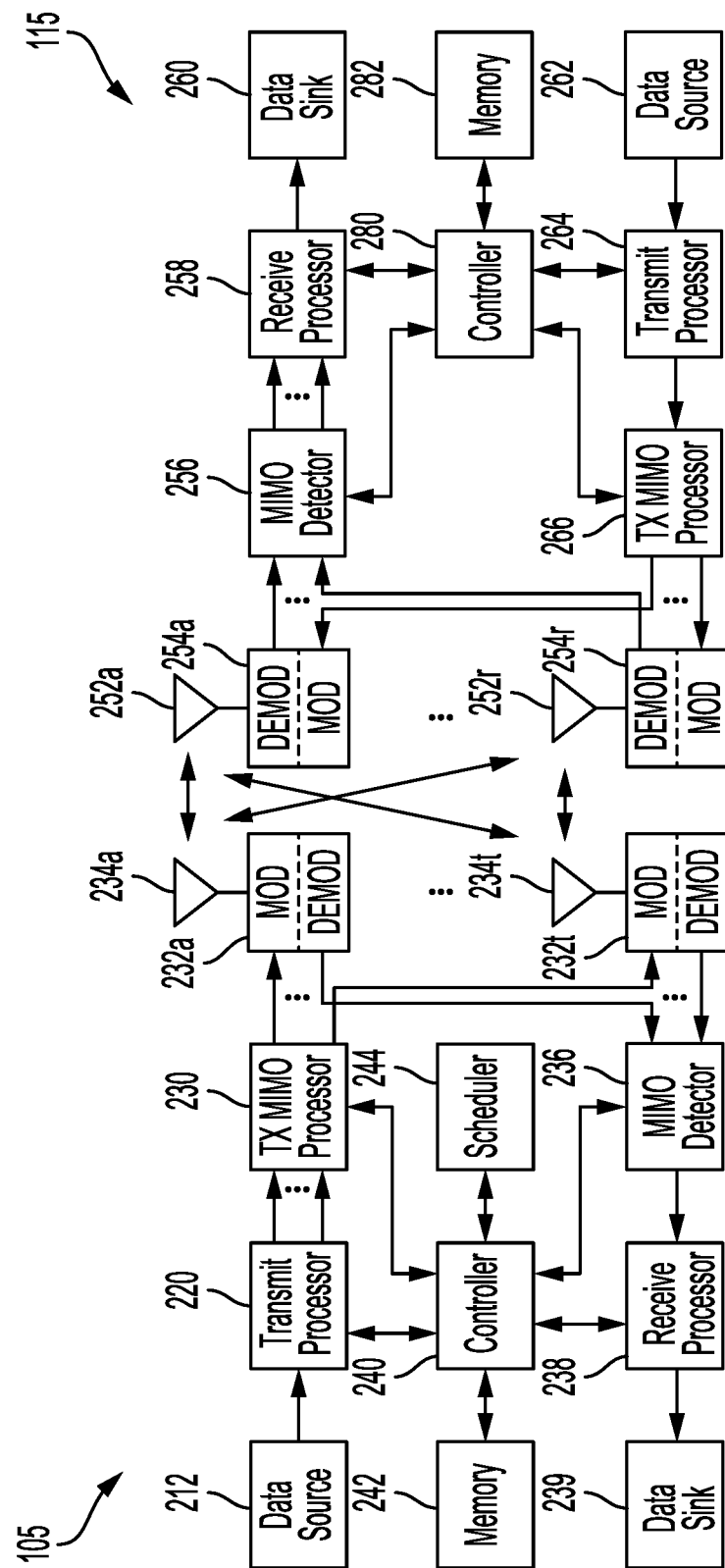
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 5 or FIG. 6, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3A:
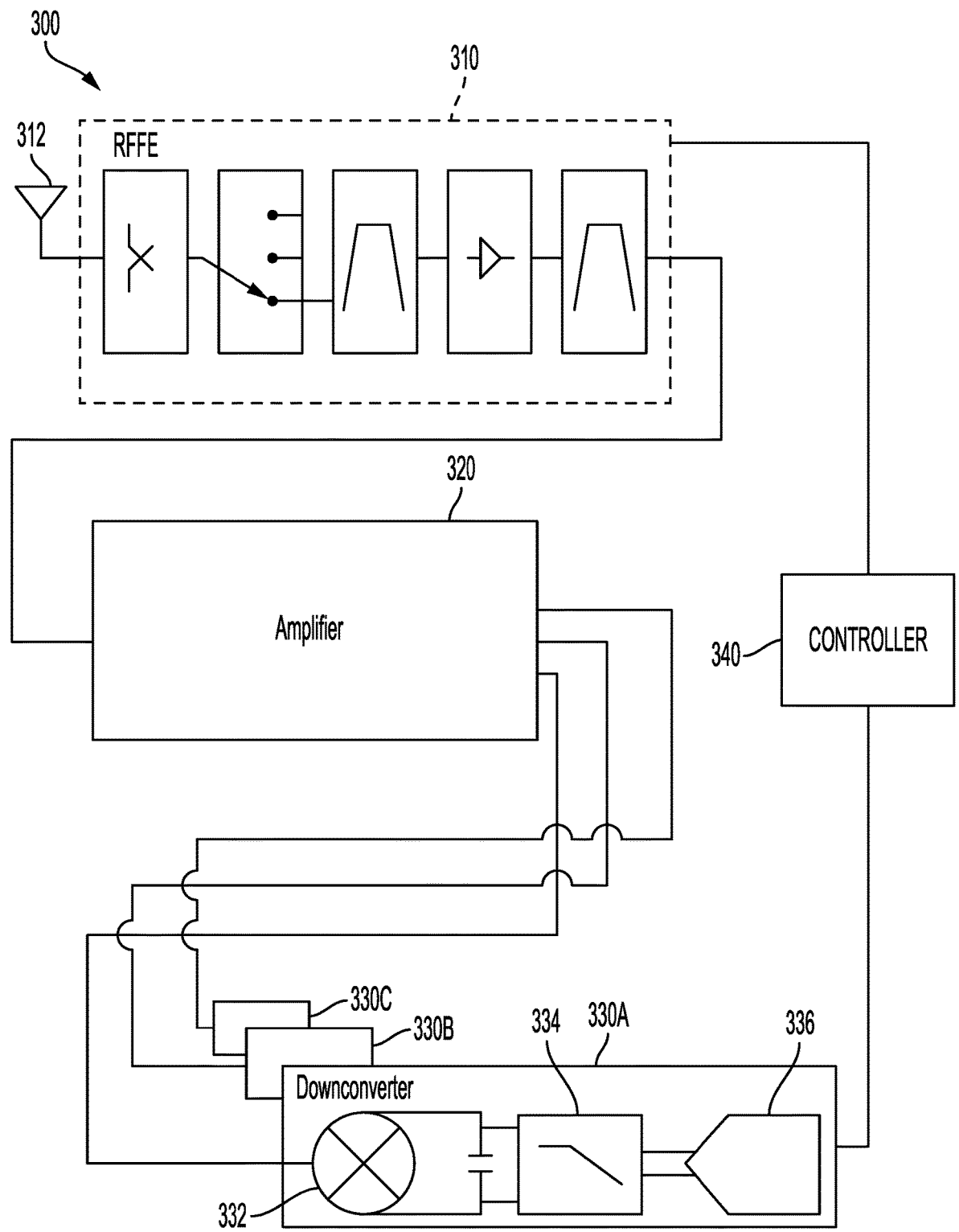
FIG. 3A is a block diagram illustrating a frequency (RF) transceiver according to one or more aspects.

FIG. 3A is a block diagram illustrating a wireless receiver circuit 300 according to one or more aspects. In some embodiments, the receiver circuit 300 may be part of a converged sub-6 Ghz and mmWave radio frequency (RF) transceiver, a sub-6 GHz radio frequency (RF) transceiver, or a mmWave radio frequency (RF) transceiver. In some embodiments, portions or all of the RF transceiver may be located in a single integrated circuit (IC) sharing a common substrate. The receiver circuit 300 may include an antenna 312 to receive radio frequency (RF) signals. The antenna 312 is coupled to a RF front-end (RFFE) 310, which may include duplexers, SAW filters, switches, and/or LNAs. The RFFE 310 is coupled to an amplifier 320, such as a low noise amplifier (LNA). The amplifier 320 is coupled to one or more downconverters 330A, 330B, and 330C. Each of the downconverters 330A, 330B, and 330C may include mixers 332 configured as downconversion mixers. In some embodiments, the downconverters 330A, 330B, and 330C may include baseband filters (BBFs) 334 and/or analog-to-digital converters (ADCs) 336. The downconverters 330A, 330B, 330C may include one or more harmonic rejection mixers (HRMs) configured as down conversion mixers. In some embodiments, the amplifier 320 is shared on an IC with one or more of the RFFE 310 and/or the downconverters 330A, 330B, and 330C.

Interference between wireless signals received at antenna 312 and processed through RFFE 310, amplifier 320, and downconverters 330A-C complicates operation of the receiver circuit 300, particularly when processing a large range of potential frequencies. For example, co-location of processing paths for sub-6 Ghz and mmWave signals in an integrated circuit can create interference between the sub-6 GHz signal harmonics and the mmWave signals. Interference between sub-6 GHz signals and mmWave signals may occur because mmWave IF signals corresponding to mmWave RF signals received at an antenna from over-the-air may be located near to sub-6 GHz signals in frequency (e.g., within 1-6 GHz) and/or located at harmonics of the sub-6 GHz (e.g., at integer multiples of the sub-6 GHz signals).

Interference between wireless signals may be further complicated by carrier aggregation (CA) operation. Carrier aggregation (CA) involves the assignment of one or more carrier RF signals, each carrying a single data stream. Carrier aggregation (CA) improves the flexibility of the wireless devices and improves network utilization by allowing devices to be assigned different numbers of carriers for different periods of time based, at least in part, on historical, instantaneous, and/or predicted bandwidth use by the wireless device. Thus, when a mobile device needs additional bandwidth, additional carriers may be assigned to that wireless device, and then de-assigned and re-assigned to other mobile devices when bandwidth demands change. As carriers are assigned and de-assigned from a mobile device, the interaction of wireless signals may change. For example, different carriers in CA may be in different bands, and certain bands may have harmonics that overlap and/or otherwise interfere with certain other bands. Certain embodiments of this disclosure may be beneficial for carrier aggregation (CA) for sub-6 GHz signals in which at least two bands may be utilized at a same time (where one band is at a third harmonic (or similar) of the other band), including uplink carrier aggregation (ULCA) or downlink carrier aggregation (DLCA) configurations or configurations in which an uplink communication is at a third harmonic (or similar) of a downlink communication or a downlink communication is at a third harmonic (or similar) of an uplink communication.

A controller 340 may detect conditions in the RF signal received from the antenna 312 or receive information regarding the carrier configuration from higher levels, such as a MAC layer or network layer. The controller 340 may configure components of the receiver circuit 300 to activate, deactivate, or control portions of the receiver circuit 300 to process an input RF signal. In some embodiments, the controller 340 configures components to reduce interference between bands within the receiver circuit 300. In some embodiments, the controller 340 may configure resistance values in one or more processing paths of mixers within the downconverters 330A, 330B, and 330C.

Figure 3B:
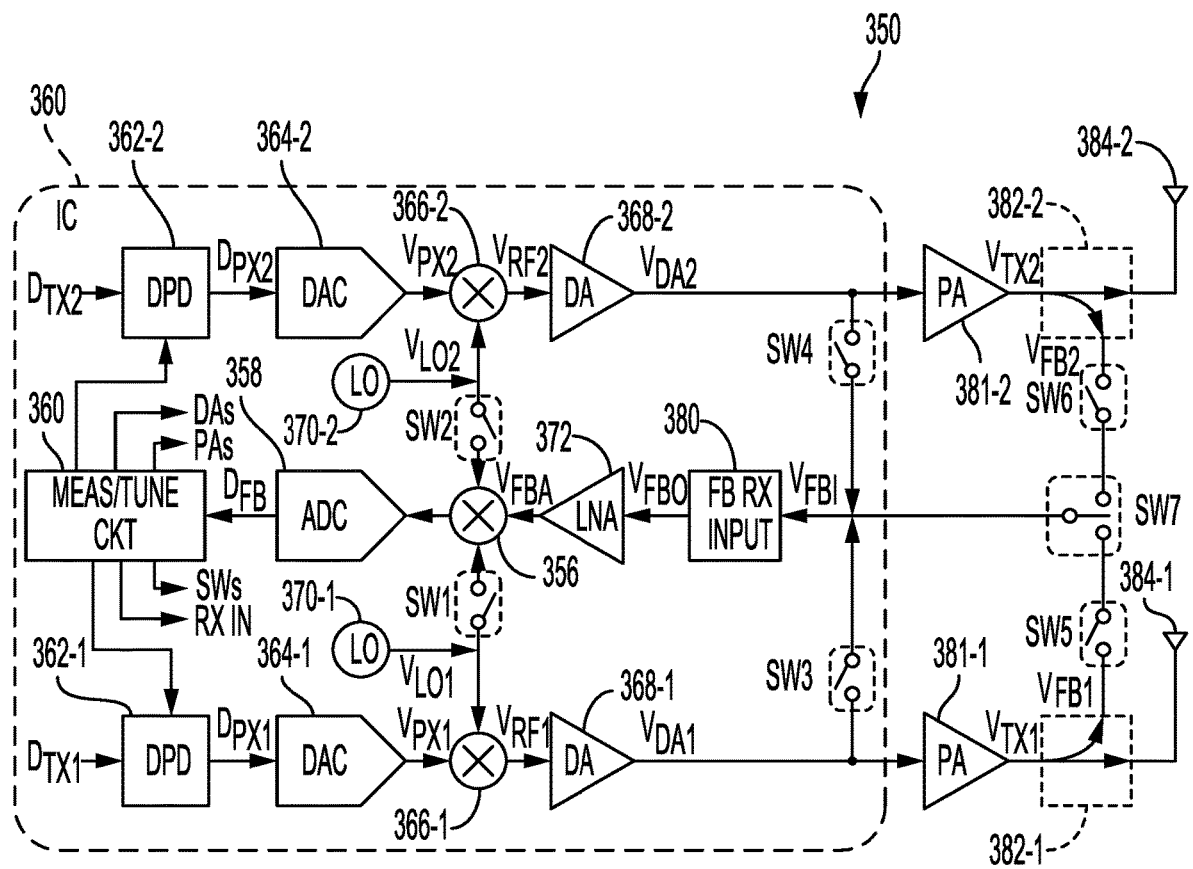
FIG. 3B is a block diagram illustrating a block diagram of an example transmitter system according to one or more aspects.

FIG. 3B is a block diagram illustrating a block diagram of an example transmitter system 350 according to one or more aspects. As discussed further herein, the transmitter system 350 may be configured to transmit signals in accordance with carrier aggregation, such as uplink carrier aggregation (ULCA). In carrier aggregation, a set of carriers may be used to transmit data simultaneously to one or more remote wireless devices. Further, the transmitter system 350 includes a feedback receiver to measure and tune a set of transmit chains used to transmit the data-modulated carriers in accordance with carrier aggregation.

In particular, the transmitter system 350 includes an integrated circuit (IC) 360, which may be implemented as a system on chip (SOC). In this example, the IC 360 includes a first transmit chain including a first digital predistortion (DPD) circuit 362-1, a first digital-to-analog converter (DAC) 364-1, a first local oscillator (LO) 370-1, a first frequency up converting mixer 366-1, and a first driver amplifier (DA) 368-1 (may also be referred to as a pre-amplifier). Similarly, the IC 360 includes a second transmit chain including a second DPD circuit 362-2, a second DAC 364-2, a second LO 370-2, a second frequency up converting mixer 366-2, and a second DA 368-2. Although, in this example, the IC 360 is shown as having two (2) transmit chains, it shall be understood that the IC 360 may include more than two (2) transmit chains.

In this example, the IC 360 includes a feedback receiver (FB RX) including an input stage, a low noise amplifier (LNA) 372, a frequency down converting mixer 356, an analog-to-digital converter (ADC) 358, a measurement/tuning circuit 360, and a first set of switching devices SW1-SW4. The measurement/tuning circuit 360 may be any processor-based circuit (e.g., microprocessor, microcontroller, field programmable gate array, etc.), which may include an associated memory with instructions, and/or part of a firmware, etc.

Further, in accordance with this example, the transmitter system 350 may further include components external to the IC 360, such as a first power amplifier (PA) 361-1, a first directional coupler 382-1, and a first antenna (or antenna array) 384-1 associated with the first transmit chain. Similarly, external to the IC 360, the transmitter system 350 may further include a second PA 368-2, a second directional coupler 382-2, and a second antenna (or antenna array) 384-2 associated with the second transmit chain. Additionally, external to the IC 360, the transmitter system 350 includes a second set of switching devices SW5 to SW7. It shall be understood that the division between what components lie within the IC 360 and what components lie external to the IC 360 may vary depending on design factors (and that certain components of the IC 360 may be split among different ICs—such as the DPD circuit 362-2 may be in a different IC than the mixer 366-2 etc.). It shall also be understood that the transmitter system 350 may be implemented with discrete components (in lieu of the IC 360) or entirely with integrated components within the IC 360.

With reference to the first transmit chain, a first digital data signal DTX1 is provided to an input of the first DPD circuit 362-1. The first DPD circuit 362-1 applies predistortion to the first digital data signal DTX1 based on control signals from the measurement/tuning circuit 360 to generate a first predistorted digital signal DPX1. The first DAC 364-1 may receive the first predistorted digital signal DPX1 directly or via one or more components, and convert the first predistorted digital signal DPX1 into a first predistorted analog signal VPX1. The first mixer 366-1 mixes the first predistorted analog signal VPX1 with a first LO signal VLO1 generated by the first LO 370-1 (upconverts the first predistorted analog signal VPX1) to generate a first radio frequency (RF) signal VRF1. It should be appreciated that in some systems the first mixer 366-1 mixes the first predistorted analog signal VPX1 with a first LO signal VLO1 generated by the first LO 370-1 (upconverts the first predistorted analog signal VPX1) to generate a first intermediate frequency (IF) that may be then upconverted to an RF frequency at a later transmitter stage. It shall be understood that one or more filters may be associated with the first mixer 336-1 to substantially remove or suppress unwanted signal components from the first RF signal VRF1.

The first DA 368-1 amplifies the first RF signal VRF1 to generate a first pre-amplified signal VDA1 based on control signals generated by the measurement/tuning circuit 360. The first PA 381-1 amplifies the first pre-amplified signal VDA1 based on control signals generated by the measurement/tuning circuit 360 to generate a first transmit signal VTX1. The first transmit signal VTX1 is provided to the first antenna 384-1 via the first directional coupler to radiate the first transmit signal VTX1 into free space for wireless transmission to one or more remote devices. The first directional coupler, in turn, couples out a portion of the first transmit signal VTX1 to generate a first feedback signal VFB1 for measurement and tuning purposes, as discussed in more detail further herein.

With reference to the second transmit chain, a second digital data signal DTX2 is provided to an input of the second DPD circuit 362-2. The second DPD circuit 362-2 applies predistortion to the second digital data signal DTX2 based on control signals from the measurement/tuning circuit 360 to generate a second predistorted digital signal DPX2. The second DAC 364-2 may receive the second predistorted digital signal DPX2 directly or via one or more components, and convert the second predistorted digital signal DPX2 into a second predistorted analog signal VPX2. The second mixer 366-2 mixes the second predistorted analog signal VPX2 with a second LO signal VLO2 generated by the second LO 370-2 (upconverts the second pre-distorted analog signal VPX2) to generate a second RF signal VRF2. It shall be understood that one or more filters may be associated with the second mixer 336-2 to substantially remove or suppress unwanted signal components from the second RF signal VRF2.

The second DA 368-2 amplifies the second RF signal VRF2 to generate a second pre-amplified signal VDA2 based on control signals generated by the measurement/tuning circuit 360. The second PA 381-2 amplifies the second pre-amplified signal VDA2 based on control signals generated by the measurement/tuning circuit 360 to generate a second transmit signal VTX2. The second transmit signal VTX2 is provided to the second antenna 384-2 via the second directional coupler 382-2 to radiate the second transmit signal VTX2 into free space for wireless transmission to one or more remote devices. The second directional coupler 382-2, in turn, couples out a portion of the second transmit signal VTX2 to generate a second feedback signal VFB2 for measurement and tuning purposes, as discussed in more detail further herein.

As discussed, the feedback receiver is for tuning the first and second transmit chains, including tuning the predistortion applied by the first and second DPD circuits 362-1 and 362-2, the gains of the first and second DAs 368-1 and 368-2, and the gains of the first and second PAs 381-1 and 381-2. For example, when the first transmit chain is to be tuned based on the first transmit signal VTX1, the measurement/tuning circuit 360 sets the switching devices SW1 and SW5 in their closed states, and the switching devices SW2, SW3, SW4, and SW6 in their open states. Additionally, the measurement/tuning circuit 360 sets the switching device SW7, which may be implemented as a single pole double throw (SPDT) switch, such that it couples the switching device SW5 to the input of the FB RX input stage, and decouples the switching device SW6 from the input of the FB RX input stage.

In this configuration, the first feedback signal VFB1 is provided to the input of the FB RX input stage as input feedback signal VFBI via the switching devices SW5 and SW7. The FB RX input stage provides a desired passband for the input feedback signal VFBI, a desired impedance matching at the input of the LNA 372, programmable signal attenuation, and third harmonic rejection based on control signals generated by the measurement/tuning circuit 360. Accordingly, the FB RX input stage produces an output feedback signal VFBO based on the input feedback signal VFBI. The LNA 372 amplifies the output feedback signal VFBO to generate an amplified feedback signal VFBA. The mixer 356 mixes the amplified feedback signal VFBA with the first LO signal VLO1 received from the first LO 370-1 via the closed switching device SW1 (down converts the amplified feedback signal VFBA) to generate a baseband feedback signal VFB. The ADC 358 converts the baseband feedback signal VFB into a digital feedback signal DFB. The measurement/tuning circuit 360 tunes the first transmit chain based on the digital feedback signal DFB.

The measurement/tuning circuit 360 processes the digital feedback signal DFB to measure distortion present in the first transmit signal VTX1, and controls/tunes the first DPD circuit 362-1 to apply predistortion to the first digital data signal DTX1 so as to reduce the distortion in the first transmit signal VTX1. The measurement/tuning circuit 360 also processes the digital feedback signal DFB to determine the power level of the first transmit signal VTX1 to control/tune the gain of the first DA 368-1 and/or the first PA 381-1.

Alternatively, or in addition to, the first transmit chain may be tuned based on the first pre-amplified signal VDA1. In this regard, the measurement/tuning circuit 360 sets the switching devices SW1 and SW3 in their closed states, and the switching devices SW2, SW4, SW5, and SW6 in their open states. As switching devices SW5 and SW6 are open, the measurement/tuning circuit 360 may set the switching device SW7 in any configuration, although setting it towards the first transmit chain may be better to reduce signal leakage from the second transmit chain into the FB RX input stage. In accordance with this measurement, the measurement/tuning circuit 360 processes the digital feedback signal DFB to determine the power level of the first pre-amplified signal VDA1 to control/tune the gain of the first DA 368-1. The tuning of the second transmit chain may operate in a similar manner as the tuning of the first transmit chain, as discussed.

Figure 4A:
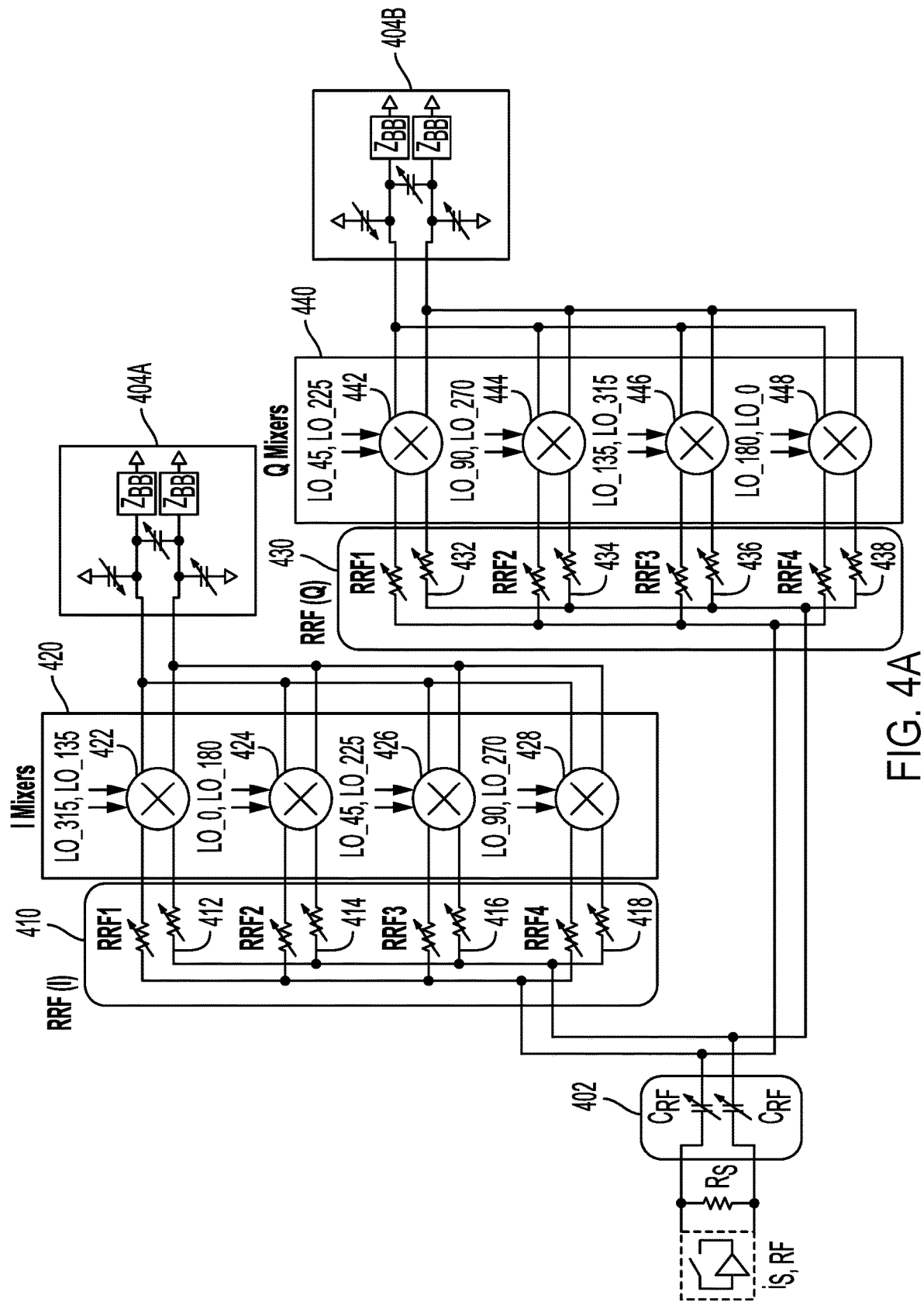
FIG. 4A is a circuit diagram illustrating an RF signal chain with mixers in a double-balanced configuration with a symmetric load on local oscillator (LO) signals according to one or more aspects of the disclosure.

FIG. 4A is a circuit diagram illustrating an RF signal chain a downconverter with a symmetric load on local oscillator (LO) signals according to one or more aspects of the disclosure. The RF signal chain may receive a radio frequency (RF) signal at capacitors 402. The RF signal may be a differential signal represented as a difference between two nodes. The differential signal is conveyed to a first set of mixers 420 and a second set of mixers 440. The first set of mixers 420 includes mixers 422, 424, 426, and 428, each coupled to oscillating signal input nodes to receive, for example, local oscillator (LO) signals. The first set of mixers 420 outputs an output signal, including a baseband (BB) signal. The first set of mixers 420 are coupled to the capacitors 402 through a first bank of resistors 410. The first bank of resistors 410 includes resistors 412, 414, 416, and 418 coupled to each of the mixers 422, 424, 426, and 428, respectively. One or more of the resistors 412, 414, 416, and 418 may be variable resistors, which may be configured by a controller, such as controller 340 of FIG. 3A. The resistances may be adjusted to control current splitting of the RF signal into mixers 422, 424, 426, and 428. The output signal from the first set of mixers 420 may be input to a baseband filter 404A.

Each of the variable resistances of the resistor bank may include two or more transistors configurable to provide different resistances. For example, the variable resistance 412 may include N parallel paths that may be individually activated or de-activated by individual bits of an N-bit codeword. In some embodiments, the variable resistance 412 may be controlled by a 7-bit code used to activate one or more of seven parallel paths comprising n-type metal-oxide-semiconductor (nMOS) transistors to provide a plurality of configurable resistances.

In a RF signal chain configured to output I- and Q-channel path baseband outputs, the RF signal chain includes a second set of mixers 440 and a second bank of resistors 430 as shown in FIG. 4A. Resistors 432, 434, 436, and 438 couple the RF signal from the capacitors 402 to the mixers 442, 444, 446, and 448, respectively. The resistors 432, 434, 436, and 438 may be variable resistors, which may be configured by a controller, such as controller 340 of FIG. 3A. The second set of mixers 440 outputs an output signal, including a baseband (BB) signal. The output signal from the second set of mixers 440 may be input to a baseband filter 404B.

The capacitors 402 are shared capacitors $C_{RF}$ such that each of the capacitors is respectively shared between two sets of mixers. For example, in the embodiment of FIG. 4A, the shared capacitors 402 include a first and second capacitor $C_{RF}$ which are respectively shared by the first set of mixers 420 and the second set of mixers 440 (e.g., respectively coupled between the oscillating input node and both, the first and the second set of mixers 420, 440). Sharing capacitors 402 between mixers in the sets of mixers and between the sets of mixers reduces the number of components in the RF signal chain and thus reduces die size for the RF signal chain and the cost of the die containing the RF signal chain. In certain embodiments with RRF1=RRF4 and RRF2=RRF3, if the $C_{RF}$ capacitors 402 were separated between the sets of mixers 420, 440 (i.e., not shared therebetween), e.g., to improve I/Q isolation, the downconversion operation would need to change because the mixer current flowing in successive 45 phases could no longer determined by the ratio of RRF1 and RRF2 alone, but also would depend upon the impedance of separate capacitors, e.g., CRFi, and CRFq. The ratio for RRF1 and RRF2 may be configured for a value between approximately 1 and 3.

Each of the mixers in the sets of mixers 420 and 440 may operate to mix the RF signal with a local oscillator (LO) signal. Each LO signal is a periodic signal, such as a clock signal, with a different phase offset from a master clock signal. The phase offset is measured in units of degrees, in which a 360-degree phase offset is equivalent to a 0-degree phase offset. Downconversion in a RF signal chain operating on a differential signal may have mixers each receiving a different pair of LO signals, in which a LO signal in the pair of LO signals has a 180-degree phase offset to the other LO signal in the pair of LO signals. For example, mixer 422 may receive a first LO signal with a 315-degree phase offset and a second LO signal with a 135-degree phase offset. Each of the other mixers 424, 426, and 428 may receive a first LO signal and second LO signal that are each 45 degrees behind in phase from the mixers 422, 424, and 426, respectively. For example, the mixer 424 may receive a 0-degree phase offset and 180-degree phase offset LO signal, the mixer 426 may receive a 45-degree phase offset and 225-degree phase offset LO signal, and the mixer 428 may receive a 90-degree phase offset and a 270-degree phase offset. The second pair of mixers 440 may be similarly configured. For example, mixer 442 may receive a 45-degree phase offset and 225-degree phase offset LO signal, the mixer 444 may receive a 90-degree phase offset and a 270-degree phase offset LO signal, the mixer 446 may receive a 135-degree phase offset and a 315-degree phase offset LO signal, and the mixer 448 may receive a 180-degree phase offset and a 0-degree phase offset LO signal.

In some embodiments, the resistor banks 410 and 430 may include configurable resistor for each mixer phase. For example, each of the resistors 412, 414, 416, and 418 may be separately configurable to provide a different resistance to the mixers 422, 424, 426, and 428, respectively. For example, the RRF values may be configured with RRF3=RRF2 and RRF4=RRF1.

In this and other embodiments of the disclosure, HRM scaling is independent of the source impedance and based primarily, or only, on a resistance ratio of RRF1 to RRF2. Such a configuration may include double-balanced mixers (DBM) or single-balanced mixers (SBM). For explanation purposes, an equivalent circuit is modeled with mixers idealized as switches, with baseband filter impedances represented as ZBB, by assuming that mixer sizes are large enough such that switch resistances (RSW) of the mixer switches are small and consequently the impedance looking into the RF port of each mixer is given by RRF+RSW+(2/$\pi^2$)ZBB which is approximately RRF because both RSW and ZBB are small in comparison to RRF. The current division during the active LO_315 phase of operation for the downconversion operation is done by two mixers activated by the LO_315 signal represented as closed switches, each of the two mixers with a different series resistances RRF1 and RRF2, respectively, and other mixers represented as opened switches. The impedance looking into the active mixers includes RRF1 in parallel with RRF2. More specifically, the current entering the mixers (imix,lo_315) is:

$$i_{mix,lo\_315} = \left( \frac{R_s}{R_s + \sqrt{(RRF_1 || RRF_2)^2 + \frac{1}{\omega^2 C_{RF}^2}}} \right) i_{s,RF} = K i_{s,RF}$$

in which $R_s$ is a source impedance and $i_{s,RF}$ is a source current. Similar current values can be computed for other active LO phases. For example, imix,lo_315 can be represented as a fraction of the source current is,RF as the factor K in the equation does not change with the clock-phase (as it is only dependent on values of Rs, RRF, and CRF). The current flowing in the I- and Q-channel paths of the RF signal chain (imix_i,lo_315 and imix_q,lo_315) can be calculated as:

$$i_{mix\_i,lo_{315}} = \left( \frac{RRF2}{RRF1 + RRF2} \right) i_{mix,lo\_315} = \left( \frac{RRF2}{RRF1 + RRF2} \right) K i_{s,RF}$$

$$i_{mix\_q,lo\_315} == \left( \frac{RRF1}{RRF1 + RRF2} \right) i_{mix,lo\_315} = \left( \frac{RRF1}{RRF1 + RRF2} \right) K i_{s,RF}$$

Similar calculations may be performed for the LO_0 phase of operations, such that:

$$i_{mix,lo\_0} = \left( \frac{R_s}{R_s + \sqrt{(RRF_1 || RRF_2)^2 + \frac{1}{\omega^2 C_{RF}^2}}} \right) i_{s,RF} = K i_{s,RF} = K i_{s,RF}$$

$$i_{mix\_i,lo_0} = \left( \frac{RRF1}{RRF1 + RRF2} \right) i_{mix,lo\_315} = \left( \frac{RRF1}{RRF1 + RRF2} \right) K i_{s,RF}$$

$$i_{mix\_q,lo\_0} == \left( \frac{RRF2}{RRF1 + RRF2} \right) i_{mix,lo\_315} = \left( \frac{RRF2}{RRF1 + RRF2} \right) K i_{s,RF}$$

With a shared capacitor at an input to the RF signal chain, values for RRF1 and RRF2 may thus be chosen independently of $R_s$ (the source impedance) based on a desired HRM ratio, for instance, to achieve acceptable third-harmonic rejection ratio (HRR3) rejection of at least 30-50 dBc without calibration overhead. HRM operation is made possible even in LNA-bypass or mixer-first modes of operation for a transceiver, although different resistance values may be calibrated and selected for different modes of operation. For example, the ratio of the currents flowing in the I- and Q-channel paths of the RF signal chain during the LO_0 and LO_315 may be represented by a simple resistive ratio of RRF1 and RRF2. HRM gain scaling is the scaling of currents flowing in the mixer during the different clock phases in a desired ratio. The above analysis shows that in embodiments of the RF signal chain described herein, this ratio may depend primarily or only on a resistance ratio (RRF1/RRF2) and has reduced dependency or no dependency on the source-impedance $R_S$. The resulting current flowing through the RF signal chain drives the information contained in the RF signal through further circuitry downstream of the RF signal chain, including a baseband processor.

In other embodiments, the RRF values may not be restricted to only two values RRF1 and RRF2, such as to obtain independent tuning of the RRF2 and RRF3 values to achieve higher HRR3 rejection. For example, with RRF1=RRF4=230 Ohms and RRF2=RRF3=100 Ohms a HRR3 of 38.8 dBc may be achieved with LO at 0.7 GHz, whereas a HRR3 of 55.5 dBc may be achieved at the same LO of 0.7 GHz with independent control over RRF1=RRF4=240 Ohms, RRF2=100 Ohms, and RRF3=110 Ohm. As another example, with RRF1=RRF4=170 Ohms and RRF2=RRF3=100 Ohms a HRR3 of 37.4 dBc may be achieved with LO at 6 GHz, whereas a HRR3 of 52.5 dBc may be achieved at the same LO of 6 GHz with independent control over RRF1=RRF4=170 Ohms, RRF2=100 Ohms, and RRF3=90 Ohm.

Different control words may be used to configure the I and Q RRF resistor banks 410 and 430, which may provide an easy-to-implement passive analog hook technique to correct frequency-independent (FID) image-rejection ratio (IRR). Any systematic offset between the I- and Q-channel paths, which can be due to a number of reasons including different lengths of I- and Q-channel path trace lengths leading to different route resistances, is likely not to change with LO frequency, and may be described as a frequency-independent asymmetry. This is in contract to frequency-dependent asymmetry, which could be due to a difference in I- and Q-channel path routing inductances and capacitances that change with frequency. Independent control of the I- and Q-channel control words, available in some embodiments of the disclosure, allow improvement of the FID image rejection ratio (IRR) by offsetting the I- and Q-channel control words with respect to each other.

In some embodiments, the value of the configurable resistors may be adjusted to provide sufficient isolation for operation with a 25% duty cycle local oscillator (LO) signal. At duty cycles values at which the LO phases are close to overlapping (e.g., within 5% of each other) or are overlapping, the resistors at appropriate resistance configurations provide the isolation sufficient to provide harmonic rejection in the mixer. The placement of the resistors before each mixer and configuration with an appropriately high value of resistance provides finite isolation between the LO phases, although the resistance value may also be balanced against losing signal path gain through the receiver circuitry by too large of values of resistances. In some embodiments, the resistance values are configured to a ratio, e.g., of RRF2/RRF1, in a range of values 1+sqrt(2)+/−10% depending on the band of operation of the transceiver.

In some embodiments, the value of the resistors may be adjusted based on an operating frequency band for the transceiver. For example, the controller 340 shown in FIG. 3A may supply a first code word to configure the first bank of resistors 410 and a second code word to configure the second bank of resistors 430 based on information regarding a configuration of a base station or other wireless device from which the receiver circuit 300 is receiving transmissions.

The RF signal chain of FIG. 4A and other embodiments including features described herein may present a symmetric load on the LO signals, which may improve LO RSB and HRR3 rejection. The symmetry is with regard to the combined load of the first plurality of mixers and the second plurality of mixers on the plurality of oscillating signals as to each oscillating signal of the plurality of oscillating signals. In some embodiments having eight (8) LO signals and four (4) double balanced mixers for the I- and Q-parts, each of the eight (8) LO signals is input to a respective one of the four (4) double balanced mixers from both the I- and the Q parts.

Figure 4B:
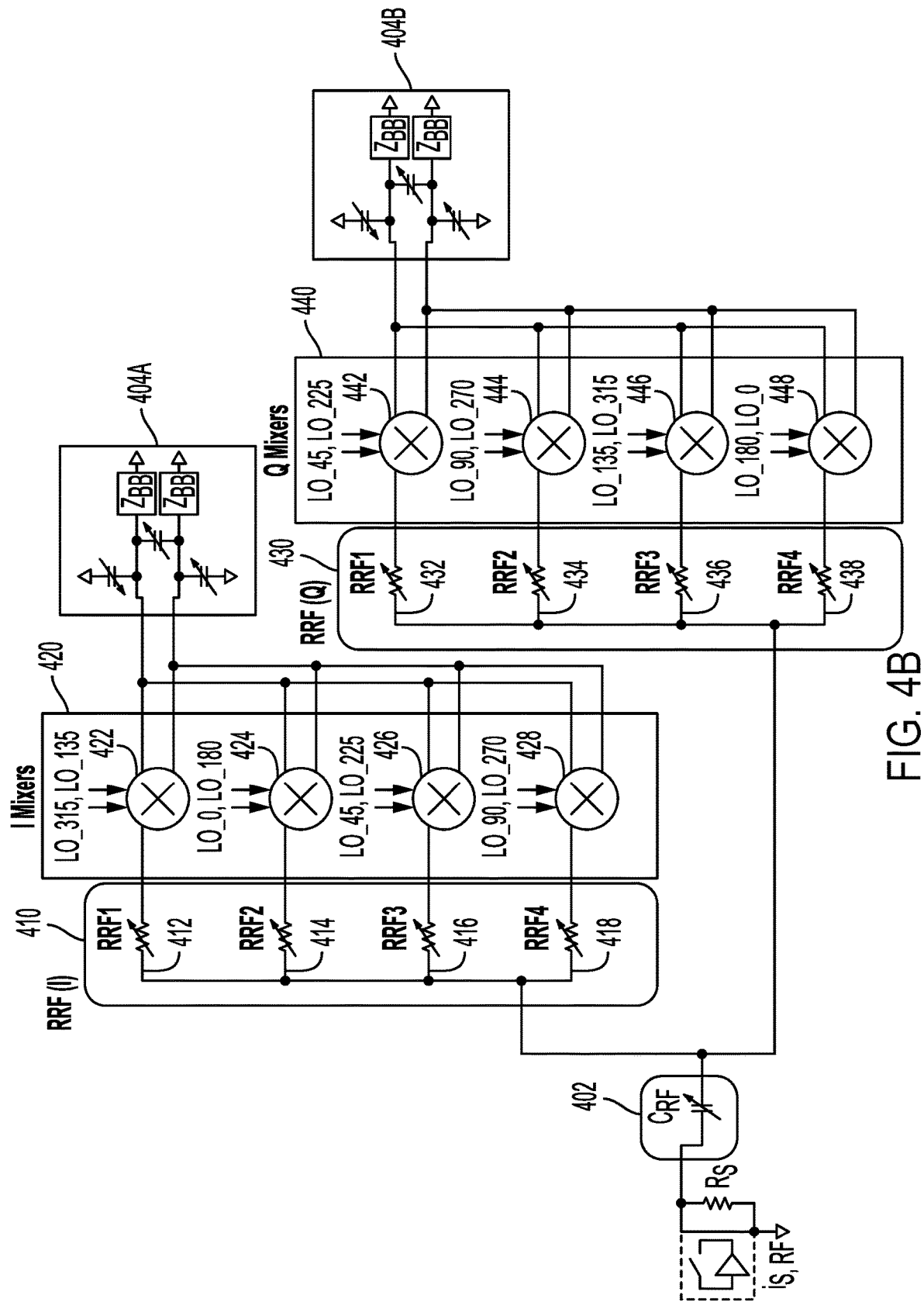
FIG. 4B is a circuit diagram illustrating an RF signal chain with mixers in a single-balanced configuration with a symmetric load on local oscillator (LO) signals according to one or more aspects of the disclosure.

The circuit embodiment shown in FIG. 4A illustrates mixers in a double-balanced configuration. In some embodiments, the circuit may be configured with single-balanced mixers as shown in FIG. 4B.

Figure 4C:
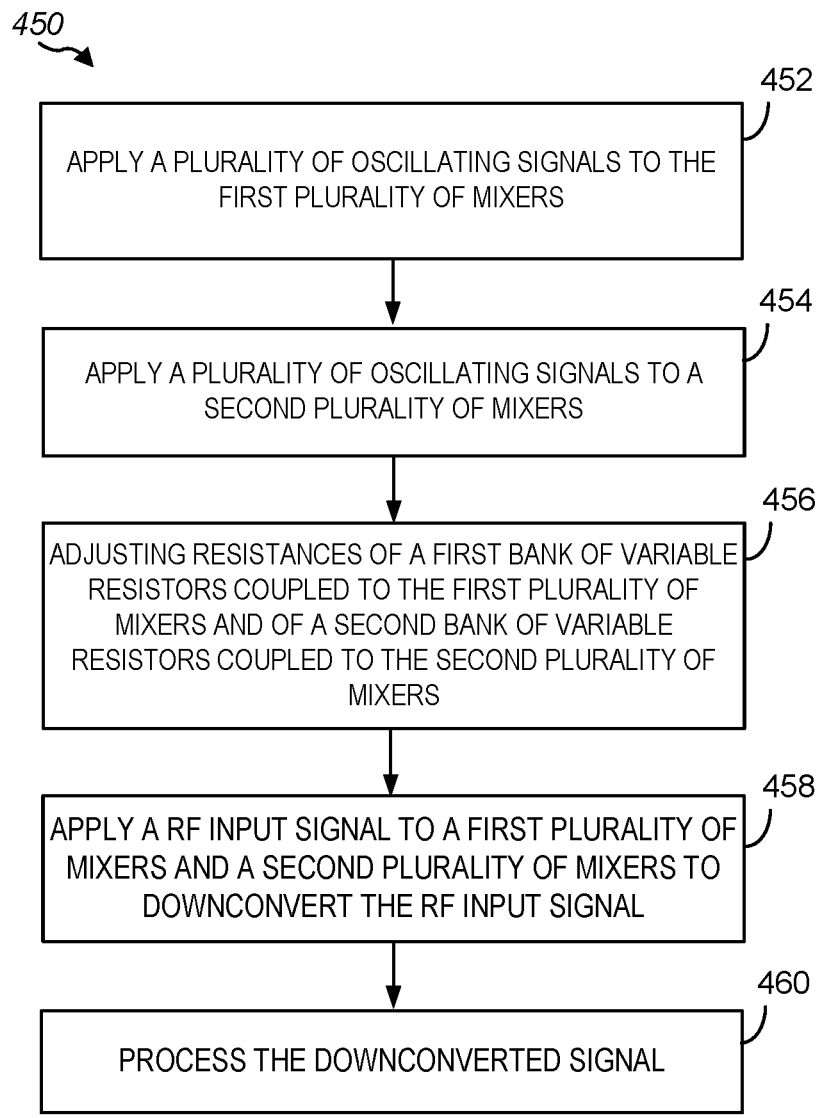
FIG. 4C is a flow chart illustrating a method of operating an RF signal chain with a symmetric load on local oscillator (LO) signals according to one or more aspects of the disclosure.

FIG. 4C is a flow chart illustrating a method of operating a RF signal chain with a symmetric load on local oscillator (LO) signals according to one or more aspects of the disclosure. A method 450 includes applying oscillating signals to mixers for downconversion of RF signals. At block 452, the method 450 includes applying a plurality of oscillating signals to a first plurality of mixers. Referring to the example embodiment of FIG. 4A, block 452 may include applying the LO_315, LO_135, LO_0, LO_180, LO_45, LO_225, LO_90, and LO_270 signals in pairs to the mixers 422, 424, 426, and 428, respectively. At block 454, the method 450 includes applying a plurality of oscillating signals to a second plurality of mixers. Referring to the example embodiment of FIG. 4A, block 454 may include applying the LO_45, LO_225, LO_90, LO_270, LO_135, LO_315, LO_180, and LO_0 signals in pairs to the mixers 442, 444, 446, and 448, respectively. In some embodiments, a combined load of the first plurality of mixers and the second plurality of mixers on the plurality of oscillating signals is symmetric as to each oscillating signal of the plurality of oscillating signals. In some embodiments with I- and Q-channel paths, symmetry may include applying the same LO signal to an equal number of mixers in the I- and Q-channel paths.

At block 456, the resistances of a first bank of variable resistors coupled to the first plurality of mixers may be adjusted and a second bank of variable resistors coupled to the second plurality of mixers may be adjusted. In some embodiments, the first bank and second bank of resistors may be adjusted in corresponding amounts, such that a first resistor RRF1 coupled to a first mixer of the first plurality of mixers has a same value as a first resistor RRF1 coupled to a first mixer of the second plurality of mixers.

At block 458, a radio frequency (RF) input signal may be applied to the first plurality of mixers and the second plurality of mixers. The application of the RF input signal to the mixers while the mixers are active and receiving the oscillating signals results in an output of the mixers being a downconverted signal containing the same information as the RF input signal. In some embodiments, the RF input signal is a signal received from an antenna, although the signal may be conditioned prior to input to the mixers, such as through a RFFE 310 of FIG. 3A. In some embodiments, the RF input signal may be applied to the pluralities of mixers through one or more shared capacitors.

At block 460, the downconverted signal output from the processing of block 458 is processed. For example, the downconverted signal may be processed through a baseband processor to determine the information content of the RF input signal. As another example, when the downconverted signal output from block 458 is an intermediate frequency (IF) signal, the IF signal may be further processed through additional downconverting mixers to obtain a baseband signal from which information may be extracted.

Figure 5:
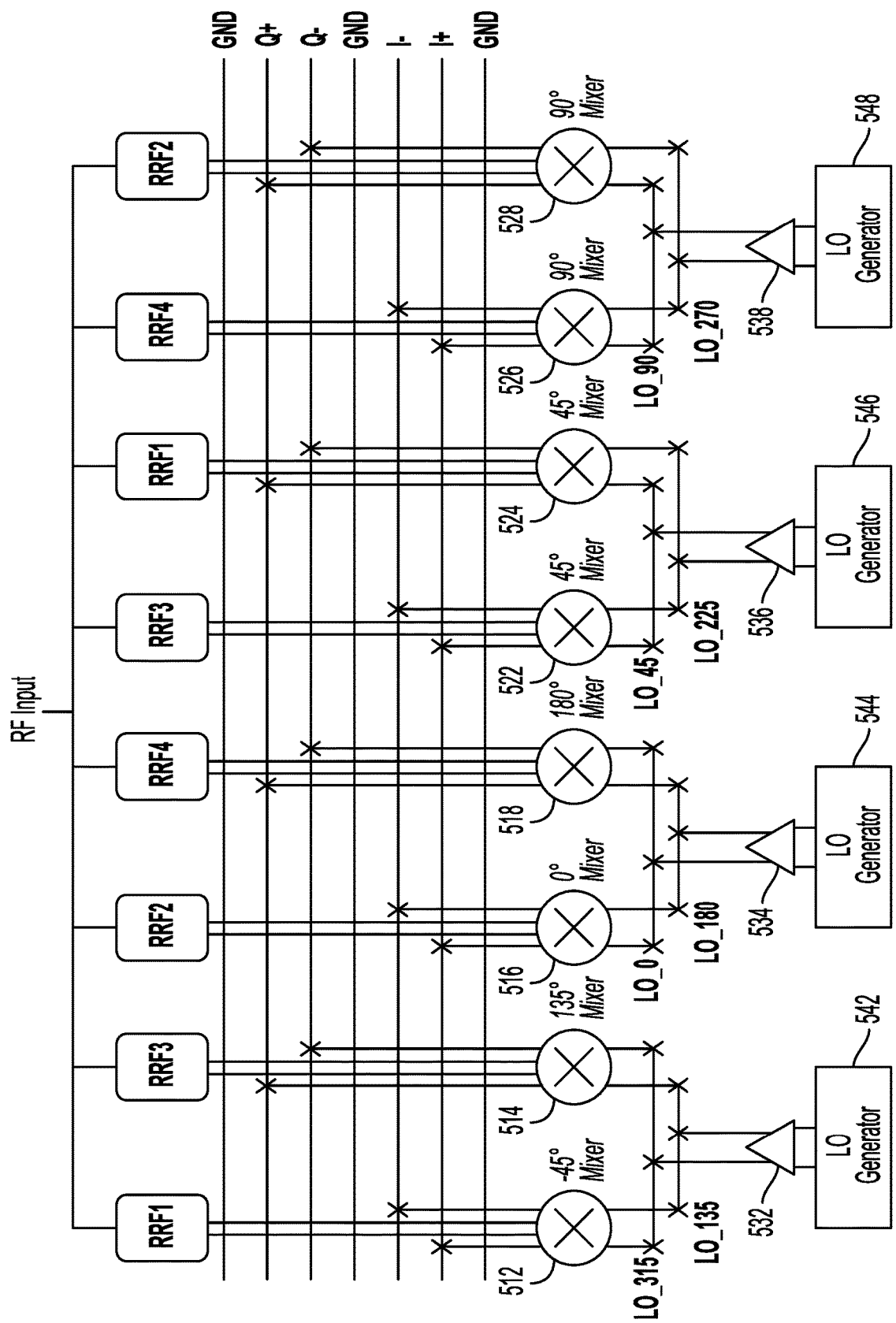
FIG. 5 is a block diagram illustrating a circuit layout for an RF signal chain with a symmetric load on local oscillator (LO) signals according to one or more aspects of the disclosure.

FIG. 5 is a block diagram illustrating a circuit layout for a RF signal chain with a symmetric load on local oscillator (LO) signals according to one or more aspects of the disclosure. An RF input signal is applied, such as through a shared capacitor not shown in FIG. 5, to variable resistances RRF1, RRF2, RRF3, RRF4. The variable resistances RRF1, RRF2, RRF3, and RRF4 are coupled to mixers 512, 514, 516, 518, 522, 524, 526, and 528. The mixers combine the input RF signal received through the variable resistances with LO signals and output downconverted signals onto differential I- and Q-channel path output signals Q+, Q−, I+, I−.

Mixers receiving the same phase offset LO signals are paired together to improve the layout of the RF signal chain circuit. For example, mixer 512 (an I-path mixer) and mixer 514 (a Q-path mixer) are placed in proximity to each other because both receive the LO_315 and LO_135 signals, which are generated by LO generator 542 coupled through buffer 532. Likewise, mixer 516 and mixer 518 are placed in proximity to each other because both receive the LO_0 and LO_180 signals, which are generated by LO generator 544 coupled through buffer 534. Further, mixer 522 and mixer 524 are placed in proximity to each other because both receive the LO_45 and LO_225 signals, which are generated by LO generator 546 coupled through buffer 536. Likewise, mixer 526 and mixer 528 are placed in proximity to each other because both receive the LO_90 and LO_270 signals, which are generated by LO generator 548 coupled through buffer 538.

The placement of mixer pairs in proximity may reduce a routing distance of the corresponding LO signals for the mixer pair by allowing the corresponding LO generator to be placed closer to the mixer pair. The placement of mixer pairs in proximity may reduce crossing of routings of the corresponding LO signals for the mixer pair by reducing an uneven capacitive coupling on the LO signals from the LO generators 542, 544, 546, and 548 to each of the mixer pairs. Placing mixers in proximity may refer to the presence of the mixers in the mixer pair located adjacent to each other with no other mixers between the mixers in the mixer pair. For example, mixer 514 is adjacent to mixer 512 with no mixer in a straight-line path between mixer 514 and mixer 512. Placing mixers in proximity may refer to the presence of the mixers in the mixer pair located such that the LO signals for the mixer pair do not cross routings of other LO signals for other mixer pairs. For example, LO_315 and LO_135 signals for the pair of mixers including mixers 512 and 514 do not cross paths with the LO_0 and LO_180 signals for the pair of mixers including mixer 516 and mixer 518. In some embodiments, the circuit layout of FIG. 5 may have I- and Q-channel mixers interdigitated (e.g., alternating) as shown in the example embodiment of FIG. 6.

Figure 6:
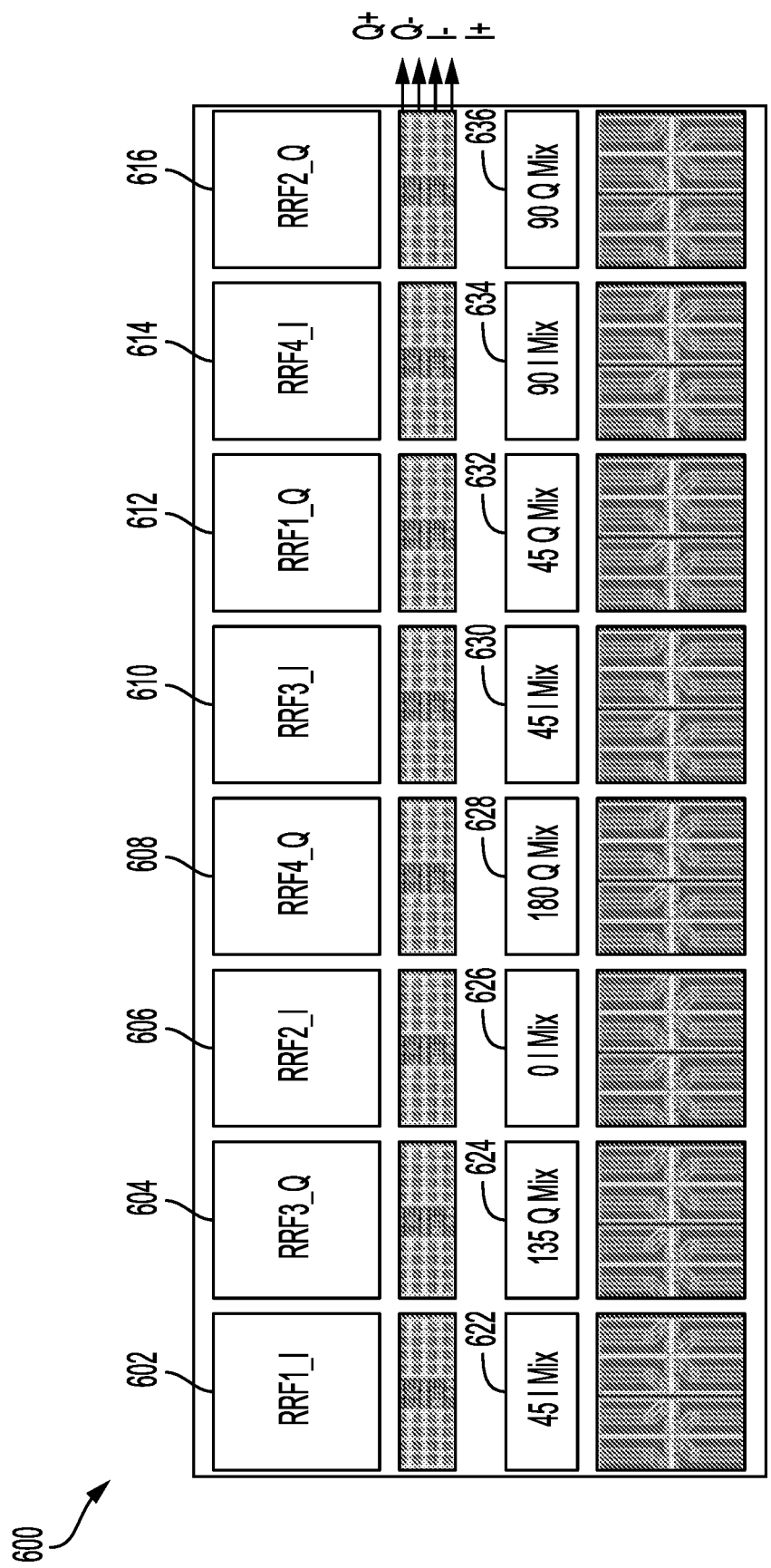
FIG. 6 is a block diagram illustrating a die map for an RF signal chain with a symmetric load on local oscillator (LO) signals according to one or more aspects of the disclosure.

FIG. 6 is a block diagram illustrating a die map for a RF signal chain with a symmetric load on local oscillator (LO) signals according to one or more aspects of the disclosure. The die 600 of FIG. 6 may correspond to an implementation of the circuit 500 of FIG. 5 on a semiconductor die, such as on a silicon substrate. Resistances 602, 604, 606, 608, 610, 612, 614, and 616 may correspond to a first bank of resistances RRF1_I, RRF2_I, RRF3_I, and RRF4_I for a first set of mixers and a second bank of resistances RRF1_Q, RRF2_Q, RRF3_Q, and RRF4_Q for a second set of mixers. The die 600 includes mixers 622, 624, 626, 628, 630, 632, 634, and 636, which in some embodiments correspond to mixers 512, 514, 516, 518, 522, 524, 526, and 528 of FIG. 5. Traces couple the resistances 602-616 to the mixers 622-636 and the mixers 622-636 to outputs Q+, Q−, I+, and I−. The die 600 illustrates an embodiment of the disclosed RF signal chain with an interdigitated-IQ layout scheme in which I- and Q-channel mixers are alternated with each other. The I mixers are interdigitated within the Q mixers, such that I mixers are adjacent to a Q mixers. In some embodiments, the only adjacent mixers to an I mixer are Q mixers, and vice versa. For example, Q mixer 624 is adjacent to I mixer 622 and I mixer 626 on the die 600. The interdigitation may reduce or minimize mismatches from LO and IF routings on the die 600. Using a finite value of resistance in resistances 602-616 provides some degree of isolation between the I- and Q-channel paths even as they are spatially located adjacent to each other, while still allowing use of MOS-FET transistor implementations of resistances.

Operations of method 450 may be performed by a UE, such as UE 115 described above with reference to FIG. 1 or FIG. 2, or a UE described with reference to FIG. 7. For example, example operations (also referred to as "blocks") of method 450 may enable UE 115 to support reconfiguring resistances of a harmonic rejection mixer (HRM).

Figure 7:
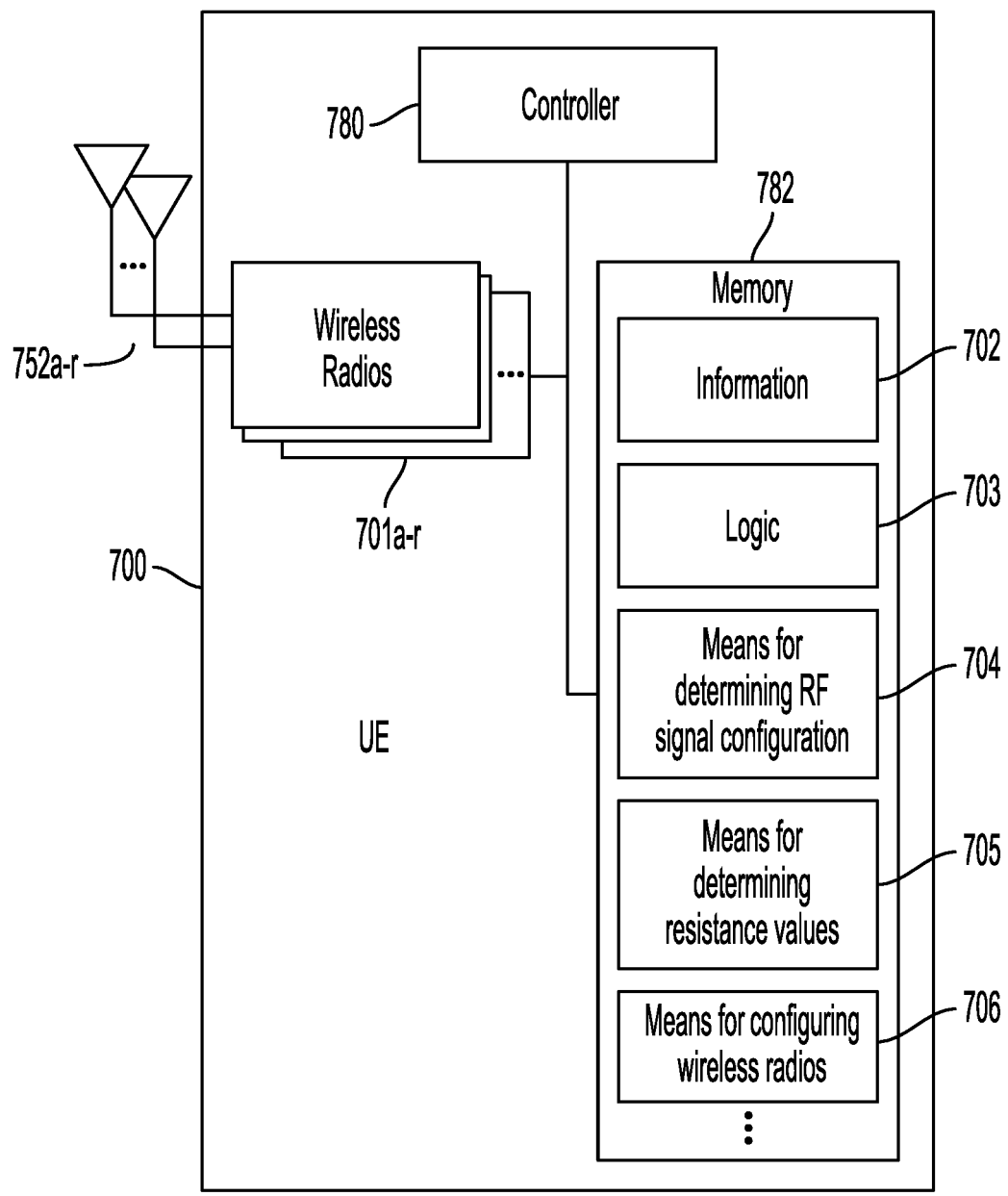
FIG. 7 is a block diagram of an example UE 700 that supports reconfiguring an RF signal chain of a wireless radio according to one or more aspects of the disclosure.

FIG. 7 is a block diagram of an example UE 700 that supports reconfiguring a RF signal chain of a wireless radio according to one or more aspects of the disclosure. UE 700 may be configured to perform operations, including the blocks of a process described with reference to the above methods. In some implementations, UE 700 includes the structure, hardware, and components shown and described with reference to UE 115 of FIG. 1 or FIG. 2. For example, UE 700 includes controller 780, which operates to execute logic or computer instructions stored in memory 782, as well as controlling the components of UE 700 that provide the features and functionality of UE 700. UE 700, under control of controller 780, transmits and receives signals via wireless radios 701a-r and antennas 752a-r. Wireless radios 701a-r include various components and hardware, as illustrated in FIG. 2 for UE 115, including modulator and demodulators 254a-r, MIMO detector 256, receive processor 258, transmit processor 264, and TX MIMO processor 266. Wireless radios 701a-r may also include one or more receiver circuits with RF signal chain configured as shown in FIG. 3A, 3B, 4A, 4B, 5, or 6.

As shown, memory 782 may include information 702, logic 703, means for determining carrier aggregation configuration 704, means for determining resistance values 705, and/or means for configuring wireless radios 706. Information 702 may be configured to include, for example, component values for corresponding sets of active frequencies and/or carrier aggregation sets. Logic 703 may be configured to process the information 702, update the information 702, generate new configuration data for information 702, and/or store information regarding the current operating mode, e.g., assigned DL grants and/or BWPs. Means for determining RF signal configuration 704 may be configured to receive information from the wireless radios 701a-r, from the controller 780, and/or from information 702 to determine active frequencies in a signal received by the UE 700. Means for determining resistance values 705 may be configured to determine resistance values for the resistor banks based on the determined wireless radio configuration from block 704. For example, block 705 may obtain appropriate information from a lookup table stored in information 702 using the configuration determined by block 705 as an index into the look-up table. Means for configuring wireless radios 706 may use the values determined by block 705 to change the configuration of one or more of the wireless radios 701a-r, such as through the controller 780. In some embodiments, some of the wireless radios 701a-r may be configured for mmWave operation and other of the wireless radios 701a-r may be configured for sub-6 GHz operation. UE 700 may receive signals from or transmit signals to one or more network entities, such as base station 105 of FIG. 1 or FIG. 2 or a base station as illustrated in FIG. 8.

Figure 8:
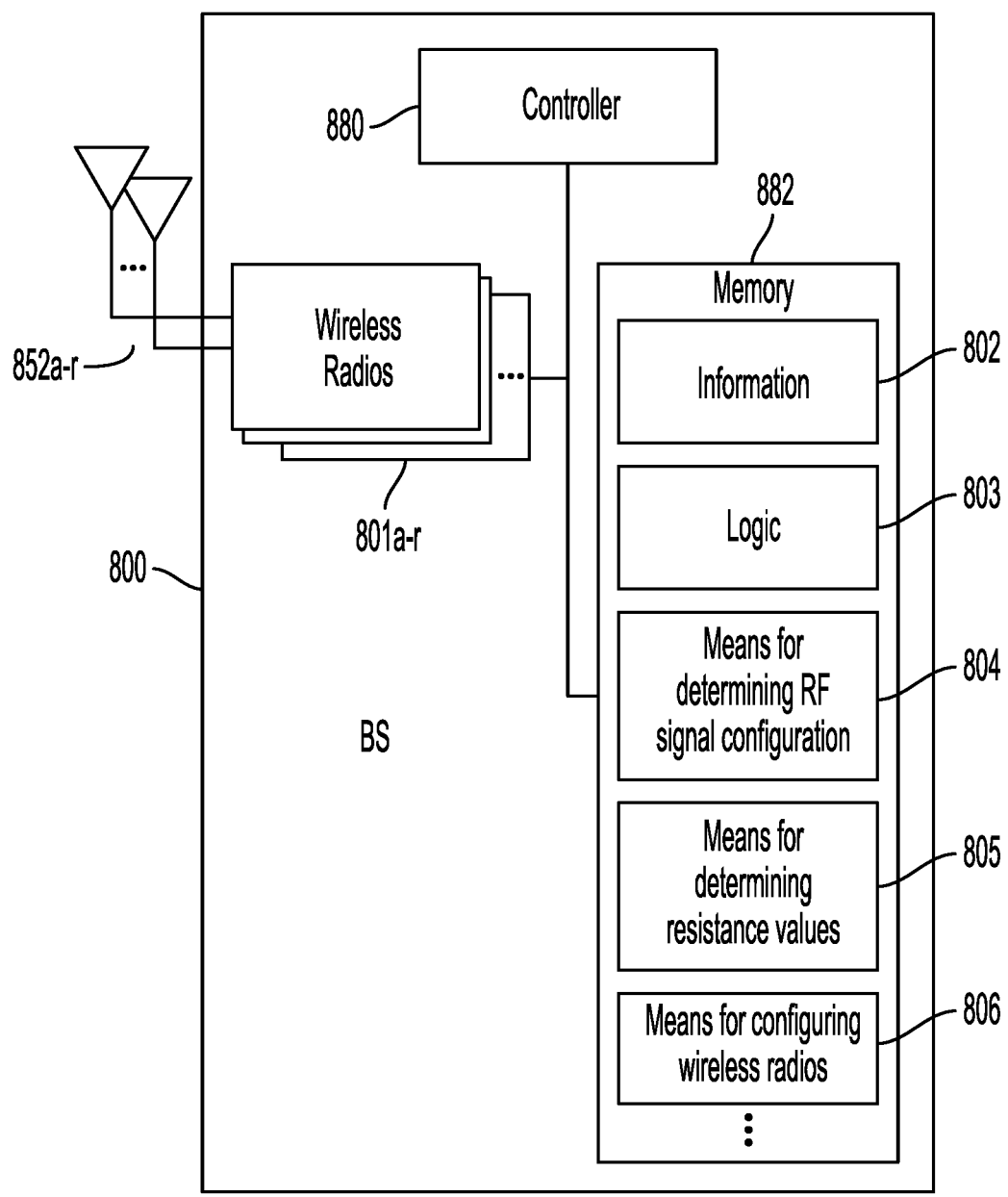
FIG. 8 is a block diagram of an example base station that supports reconfiguring an RF signal chain of a wireless radio according to one or more aspects of the disclosure.

FIG. 8 is a block diagram of an example base station 800 that supports reconfiguring a RF signal chain of a wireless radio according to one or more aspects of the disclosure. Base station 800 may be configured to perform operations, including the blocks of method 450 described with reference to FIG. 4B. In some implementations, base station 800 includes the structure, hardware, and components shown and described with reference to base station 105 of FIG. 1 or FIG. 2. For example, base station 800 may include controller 240, which operates to execute logic or computer instructions stored in memory 242, as well as controlling the components of base station 800 that provide the features and functionality of base station 800. Base station 800, under control of controller 240, transmits and receives signals via wireless radios 801a-t and antennas 834a-t. Wireless radios 801a-t include various components and hardware, as illustrated in FIG. 2 for base station 105, including modulator and demodulators 232a-t, transmit processor 220, TX MIMO processor 230, MIMO detector 236, and receive processor 238. Wireless radios 801a-r may also include one or more receiver circuits with RF signal chains configured as shown in FIG. 3A, 3B, 4A, 4B, 5, or 6.

As shown, memory 882 may include information 802, logic 803, means for determining carrier aggregation configuration 804, means for determining resistance values 805, and/or means for configuring wireless radios 806. Information 802 may be configured to include, for example, component values for corresponding sets of active frequencies and/or carrier aggregation sets. Logic 803 may be configured to process the information 802, update the information 802, generate new configuration data for information 802, and/or store information regarding the current operating mode, e.g., assigned DL grants and/or BWPs. Means for determining carrier aggregation 804 may be configured to receive information from the wireless radios 801a-r, from the controller 880, and/or from information 802 to determine active frequencies in a carrier aggregation configuration for the BS 800. Means for configuring wireless radios 806 may use the values determined by block 805 to change the configuration of one or more of the wireless radios 801a-r, such as through the controller 880. In some embodiments, some of the wireless radios 801a-r may be configured for mmWave operation and other of the wireless radios 801a-r may be configured for sub-6 GHz operation. The means for determining resistance values 805 may use information regarding the physical location of certain wireless radios 801a-r relative to other wireless radios 810a-r to determine the degeneration component values. For example, the closeness of a mmWave wireless radio and a sub-6 GHz wireless radio may be used to determine whether interference may be generated between two frequency bands being processed through the wireless radios 801a-r. Base station 800 may receive signals from or transmit signals to one or more UEs, such as UE 115 of FIG. 1 or FIG. 2 or UE 700 of FIG. 7.

In one or more aspects, techniques for supporting wireless communications, such as on multiple frequency bands, may include additional aspects, such as any single aspect or any combination of aspects described below or in connection with one or more other processes or devices described elsewhere herein. In a first aspect, supporting wireless communication may include an apparatus with a downconversion mixer, such as a harmonic rejection mixer (HRM). Additionally, the apparatus may perform or operate according to one or more aspects as described below. In some implementations, the apparatus includes a wireless device, such as a UE or a base station (BS). In some implementations, the apparatus may include at least one processor, and a memory coupled to the processor. The processor may be configured to perform operations described herein with respect to the apparatus, including operations described herein with respect to methods of operating a wireless device. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a first aspect, supporting wireless communication may include an apparatus configured for processing RF signals received from an antenna and/or conveyed to an antenna. The apparatus includes a radio frequency (RF) input node for receiving an antenna signal; a plurality of oscillating signal input nodes configured to receive a plurality of oscillating signals, wherein each oscillating signal of the plurality of oscillating signals is out of phase with other oscillating signals of the plurality of oscillating signals; a first plurality of mixers, wherein each mixer of the first plurality of mixers is coupled to two oscillating signals of the plurality of oscillating signals that are 180 degrees apart in phase; a second plurality of mixers, wherein each mixer of the second plurality of mixers is coupled to two oscillating signals of the plurality of oscillating signals that are 180 degrees apart in phase, wherein a combined load of the first plurality of mixers and the second plurality of mixers on the plurality of oscillating signals is symmetric as to each oscillating signal of the plurality of oscillating signals; and a capacitor coupling the RF input node to the first plurality of mixers and the second plurality of mixers.

In a second aspect, in combination with the first aspect, the apparatus further includes a first configurable resistance coupled between the first plurality of mixers and the capacitor; and a second configurable resistance coupled between the second plurality of mixers and the capacitor.

In a third aspect, in combination with one or more of the first aspect or the second aspect, the first configurable resistance comprises a first plurality of configurable resistances, at least one configurable resistance of the first plurality of configurable resistances coupled between each of the first plurality of mixers and the capacitor.

In a fourth aspect, in combination with one or more of the first aspect through the third aspect, the second configurable resistance comprises a second plurality of configurable resistances, at least one configurable resistance of the second plurality of configurable resistances coupled between each of the second plurality of mixers and the capacitor.

In a fifth aspect, in combination with one or more of the first aspect through the fourth aspect, the apparatus further includes a controller coupled to the first configurable resistance and the second configurable resistance and configured to adjust the first configurable resistance and the second configurable resistance based on a band configuration of the antenna signal.

In a sixth aspect, in combination with one or more of the first aspect through the fifth aspect, the apparatus further includes a controller coupled to the first configurable resistance and the second configurable resistance, wherein the controller is configured to adjust the first plurality of configurable resistances and the second plurality of configurable resistances to set a ratio of a first current through the first configurable resistance to an active mixer of the first plurality of mixers to a second current through the second configurable resistance to an active mixer of the second plurality of mixers, wherein the controller is configured to set the ratio to between 1 and 3.

In a seventh aspect, in combination with one or more of the first aspect through the sixth aspect, the apparatus further includes a configurable radio frequency front end (RFFE) coupled between an antenna and the RF input node, the configurable RFFE comprising an LNA circuit and a bypass circuit path that bypasses the LNA circuit, the configurable RFFE having a plurality of modes with different source impedances, wherein the controller is configured to control the first configurable resistance and the second configurable resistance independent of control of a mode of the configurable RFFE.

In an eighth aspect, in combination with one or more of the first aspect through the seventh aspect, the apparatus further includes at least one LO driver configured to generate the plurality of oscillating signals, wherein the at least one LO driver is configured to generate oscillating signals with 25% duty cycle for the plurality of oscillating signals.

In a ninth aspect, in combination with one or more of the first aspect through the eighth aspect, the first plurality of mixers and the second plurality of mixers are arranged such that a first mixer of the first plurality of mixers coupled to a first oscillating signal of the plurality of oscillating signals is adjacent to a second mixer of the second plurality of mixers coupled to the first oscillating signal of the plurality of oscillating signals.

In a tenth aspect, in combination with one or more of the first aspect through the ninth aspect, the first plurality of mixers are configured to output an I-channel path baseband signal corresponding to the antenna signal; and the second plurality of mixers are configured to output a Q-channel path baseband signal corresponding to the antenna signal.

In an eleventh aspect, in combination with one or more of the first aspect through the tenth aspect, the apparatus further includes a first plurality of configurable resistances coupled between the first plurality of mixers and the capacitor, at least one configurable resistance of the first plurality of configurable resistances coupled between each of the first plurality of mixers and the capacitor; and a second plurality of configurable resistances coupled between the second plurality of mixers and the capacitor, at least one configurable resistance of the second plurality of configurable resistances coupled between each of the second plurality of mixers and the capacitor, wherein a first combined resistance of: a first configurable resistance coupled to a first mixer of the first plurality of mixers configured to receive a first oscillating signal of the plurality of oscillating signals having a first phase and a second configurable resistance coupled to a first mixer of the second plurality of mixers configured to receive a second oscillating signal having the first phase has substantially a same value as a second combined resistance of: a third configurable resistance coupled to a second mixer of the first plurality of mixers configured to receive a third oscillating signal of the plurality of oscillating signals having a second phase and a fourth configurable resistance coupled to a second mixer of the second plurality of mixers configured to receive a fourth oscillating signal having the second phase.

In a twelfth aspect, in combination with one or more of the first aspect through the eleventh aspect, the combined load on each oscillating signal is four transistors comprising two transistors of a first mixer of the first plurality of mixers and two transistors of a second mixer of the second plurality of mixers.

In a thirteenth aspect, in combination with one or more of the first aspect through the twelfth aspect, a method of performing wireless communications includes applying a radio frequency (RF) input signal to a first plurality of mixers and a second plurality of mixers through a shared capacitor; applying a plurality of oscillating signals to the first plurality of mixers, wherein each mixer of the first plurality of mixers is coupled to two oscillating signals of the plurality of oscillating signals that are 180 degrees apart in phase; and applying the plurality of oscillating signals to a second plurality of mixers, wherein each mixer of the second plurality of mixers is coupled to two oscillating signals of the plurality of oscillating signals that are 180 degrees apart in phase, wherein a combined load of the first plurality of mixers and the second plurality of mixers on the plurality of oscillating signals is symmetric as to each oscillating signal of the plurality of oscillating signals.

In a fourteenth aspect, in combination with one or more of the first aspect through the thirteenth aspect, the method includes applying a first configurable resistance between the shared capacitor and the first plurality of mixers; and applying a second configurable resistance between the shared capacitor and the second plurality of mixers.

In a fifteenth aspect, in combination with one or more of the first aspect through the fourteenth aspect, applying the first configurable resistance comprises applying a first plurality of configurable resistances between the shared capacitor and the first plurality of mixers, and applying the second configurable resistance comprises applying a second plurality of configurable resistances between the shared capacitor and the second plurality of mixers.

In a sixteenth aspect, in combination with one or more of the first aspect through the fifteenth aspect, the method further includes controlling the first plurality of configurable resistances and the second plurality of configurable resistances based on a band configuration of an antenna receiving the RF input signal.

In a seventeenth aspect, in combination with one or more of the first aspect through the sixteenth aspect, controlling the first plurality of configurable resistances and the second plurality of configurable resistances comprises: adjusting the first plurality of configurable resistances and the second plurality of configurable resistances to set a ratio of a first current through the first configurable resistance to an active mixer of the first plurality of mixers to a second current through the second configurable resistance to an active mixer of the second plurality of mixers, wherein the ratio is between 1 and 3.

In an eighteenth aspect, in combination with one or more of the first aspect through the seventeenth aspect, controlling the first plurality of configurable resistances and the second plurality of configurable resistances comprises providing resistance scaling of the RF input signal independent of a source impedance of the RF input signal.

In a nineteenth aspect, in combination with one or more of the first aspect through the eighteenth aspect, the method further includes controlling a radio frequency front end (RFFE) to operate in one of a plurality of modes, wherein controlling the first plurality of configurable resistances and the second plurality of configurable resistances is independent of control of a mode of the RFFE.

In a twentieth aspect, in combination with one or more of the first aspect through the nineteenth aspect, the plurality of modes comprises mixer-first mode and LNA bypass mode.

In a twenty-first aspect, in combination with one or more of the first aspect through the twentieth aspect, the combined load on each oscillating signal is four transistors comprising two transistors of a first mixer of the first plurality of mixers and two transistors of a second mixer of the second plurality of mixers.

In a twenty-second aspect, in combination with one or more of the first aspect through the twenty-first aspect, the method further includes generating an I-channel path baseband signal based on the first plurality of mixers; and generating a Q-channel baseband signal based on the second plurality of mixers.

In a twenty-third aspect, in combination with one or more of the first aspect through the twenty-second aspect, an apparatus for wireless communications includes a radio frequency (RF) input node configured to receive an RF input signal; at least four first mixer circuits coupled between the RF input node and an in-phase output node, each of the at least four first mixer circuits configured to receive the RF input signal and configured to receive two local oscillator (LO) signals of a plurality of LO signals, wherein each LO signal of the plurality of LO signals is out of phase relative to other LO signals of the plurality of LO signals, and wherein the two LO signals are 180 degrees apart in phase; at least four second mixer circuits coupled between the RF input node and a quadrature output node, each of the at least four second mixer circuits configured to receive the RF input signal and configured to receive two LO signals of the plurality of LO signals, wherein the two LO signals are 180 degrees apart in phase; a capacitor coupled between the RF input node and each of the at least four first mixer circuits and each of the at least four second mixer circuits; a first plurality of resistors coupled between the capacitor and the at least four first mixer circuits; and a second plurality of resistors coupled between the capacitor and the at least four second mixer circuits.

In a twenty-fourth aspect, in combination with one or more of the first aspect through the twenty-third aspect, a ratio of resistances in the first plurality of resistors and second plurality of resistors is configured such that there is no change in input current to the at least four first mixer circuits and the at least four second mixer circuits between phases of the plurality of LO signals.

In a twenty-fifth aspect, in combination with one or more of the first aspect through the twenty-fourth aspect, the apparatus further includes a circuit coupled between an antenna and the RF input node, the circuit comprising an LNA circuit and a bypass circuit path that bypasses the LNA circuit.

In a twenty-sixth aspect, in combination with one or more of the first aspect through the twenty-fifth aspect, a combined load of the at least four first mixer circuits and the at least four second mixer circuits on the plurality of LO signals is symmetric as to each LO signal of the plurality of LO signals.

In a twenty-seventh aspect, in combination with one or more of the first aspect through the twenty-sixth aspect, the at least four first mixer circuits and the at least four second mixer circuits are arranged such that a first mixer of the at least four first mixer circuits coupled to a first LO signal of the plurality of LO signals is adjacent to a second mixer of the at least four second mixer circuits coupled to the first LO signal of the plurality of LO signals.

In a twenty-eighth aspect, in combination with one or more of the first aspect through the twenty-seventh aspect, a harmonic rejection mixer (HRM) includes an radio frequency (RF) input; a first set of in-phase mixers; a second set of quadrature-phase mixers; a second set of two IF outputs; wherein each of the two RF input nodes of each of the second set of four (4) double-balanced mixers is coupled via a different resistor of the second set of eight (8) configurable resistors to the RF input, and wherein each of the two LO input nodes of each of the second set of four (4) double-balanced mixers is coupled via a different one of the eight (8) LO phases, wherein each of the second set of two IF outputs is coupled to a different one of the two IF output nodes of all of the second set of four (4) double-balanced mixers, wherein a resistance value of at least one of the first set of eight (8) configurable resistors, coupled to a first RF input node of a respective one of the first set of four (4) double-balanced mixers to which a first phase of the eight (8) LO phases is supplied, is configured differently from a resistance value of a respective one of the second set of eight (8) resistors coupled to a second RF input node of a respective one of the second set of four (4) double-balanced mixers to which a second phase of the same eight (8) LO phases is supplied, wherein the first phase of the eight (8) LO phases and the second phase of the same eight (8) LO phases are subsequent phases from the eight (8) LO phases. The first set of in-phase mixers may include a first set of eight (8) configurable resistors; a first set of four (4) double-balanced mixers, each double-balanced mixer comprising two RF input nodes, two local oscillator (LO) input nodes, and two intermediate frequency (IF) output nodes; a first set of two IF outputs; wherein each of the two RF input nodes of each of the first set of four (4) double-balanced mixers is coupled via a different resistor of the first set of eight (8) configurable resistors to the RF input, wherein each of the two LO input nodes of each of the first set of four (4) double-balanced mixers is supplied with a different one of eight (8) LO phases, and wherein each of the first set of two IF outputs is coupled to a different one of the two IF output nodes of all of the first set of four (4) double-balanced mixers. The second set of quadrature-phase mixers includes a second set of eight (8) configurable resistors; and a second set of four (4) double-balanced mixers, each comprising two RF input nodes, two LO input nodes, and two IF output nodes.

In a twenty-ninth aspect, in combination with one or more of the first aspect through the twenty-eighth aspect, the HRM further includes a capacitor coupled between the RF input and each of the first set of in-phase mixers and the second set of quadrature-phase mixers, wherein a ratio of resistances in the first set of eight (8) configurable resistors and second set of eight (8) configurable resistors is configured such that there is no change in input current to the first set of four (4) double-balanced mixers and the second set of four (4) double-balanced mixers between phases of the eight (8) LO phases.

In a thirtieth aspect, in combination with one or more of the first aspect through the twenty-ninth aspect, the HRM further includes a circuit coupled between an antenna and the RF input, the circuit comprising an LNA circuit and a bypass circuit path that bypasses the LNA circuit.

In a thirty-first aspect, in combination with one or more of the first aspect through the thirtieth aspect, a combined load of the first set of four (4) double-balanced mixers and the second set of four (4) double-balanced mixers on the plurality of LO signals is symmetric as to each LO phase of the eight (8) LO phases.

In a thirty-second aspect, in combination with one or more of the first aspect through the thirty-first aspect, the first set of four (4) double-balanced mixers and the second set of four (4) double-balanced mixers are arranged such that a first mixer of the first set of four (4) double-balanced mixers coupled to a first LO phase of the eight (8) LO phases is adjacent to a second mixer of the second set of four (4) double-balanced mixers coupled to the first LO phase of the eight (8) LO phases.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIG. 3A (or 3B) and 4A or 4B may be combined with one or more blocks (or operations) described with reference to another of the figures. For example, one or more blocks (or operations) of FIG. 3A may be combined with one or more blocks (or operations) of FIG. 1. As another example, one or more blocks associated with FIG. 4A or FIG. 4B may be combined with one or more blocks (or operations) associated with FIG. 1. Additionally, or alternatively, one or more operations described above with reference to FIGS. 1-4B may be combined with one or more operations described with reference to FIGS. 5-8.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower" or "front" and "back" or "top" and "bottom" or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus, comprising:
   a first plurality of mixers, wherein each mixer of the first plurality of mixers is configured to be coupled to two oscillating signals that are 180 degrees apart in phase from among a plurality of oscillating signals;
   a second plurality of mixers, wherein each mixer of the second plurality of mixers is configured to be coupled to two oscillating signals that are 180 degrees apart in phase from among the plurality of oscillating signals,
   wherein each oscillating signal of the plurality of oscillating signals is out of phase with other oscillating signals of the plurality of oscillating signals, and
   wherein a combined load of the first plurality of mixers and the second plurality of mixers on the plurality of oscillating signals is symmetric as to each oscillating signal of the plurality of oscillating signals; and
   a capacitor coupled to the first plurality of mixers and the second plurality of mixers and configured for coupling a radio frequency (RF) signal to the first plurality of mixers and the second plurality of mixers.

2. The apparatus of claim 1, further comprising:
   a first configurable resistance coupled between the first plurality of mixers and the capacitor; and
   a second configurable resistance coupled between the second plurality of mixers and the capacitor.

3. The apparatus of claim 2, wherein:
   the first configurable resistance comprises a first plurality of configurable resistances, at least one configurable resistance of the first plurality of configurable resistances coupled between each of the first plurality of mixers and the capacitor, and
   the second configurable resistance comprises a second plurality of configurable resistances, at least one configurable resistance of the second plurality of configurable resistances coupled between each of the second plurality of mixers and the capacitor.

4. The apparatus of claim 3, further comprising:
   a controller coupled to the first configurable resistance and the second configurable resistance, wherein the controller is configured to adjust the first configurable resistance and the second configurable resistance based on a band configuration of the RF signal.

5. The apparatus of claim 3, further comprising a controller coupled to the first configurable resistance and the second configurable resistance, wherein the controller is configured to adjust the first plurality of configurable resistances and the second plurality of configurable resistances to set a ratio of a first current through the first configurable resistance to an active mixer of the first plurality of mixers to a second current through the second configurable resistance to an active mixer of the second plurality of mixers, wherein the controller is configured to set the ratio of the first current to the second current to between 1 and 3.

6. The apparatus of claim 5, further comprising:
a configurable radio frequency front end (RFFE) coupled between an antenna and the first plurality of mixers and the second plurality of mixers, the configurable RFFE comprising a low-noise amplifier (LNA) circuit and a bypass circuit path that bypasses the LNA circuit, the configurable RFFE having a plurality of modes with different source impedances, and
wherein the controller is configured to control the first configurable resistance and the second configurable resistance independent of control of a mode of the configurable RFFE.

7. The apparatus of claim 1, further comprising at least one local oscillator (LO) driver configured to generate the plurality of oscillating signals, wherein the at least one LO driver is configured to generate oscillating signals with 25% duty cycle for the plurality of oscillating signals.

8. The apparatus of claim 1, wherein the first plurality of mixers and the second plurality of mixers are arranged such that a first mixer of the first plurality of mixers coupled to a first oscillating signal of the plurality of oscillating signals is adjacent to a second mixer of the second plurality of mixers coupled to the first oscillating signal of the plurality of oscillating signals.

9. The apparatus of claim 1, wherein:
the first plurality of mixers are configured to output an I-channel baseband signal corresponding to the RF signal, and
the second plurality of mixers are configured to output a Q-channel baseband signal corresponding to the RF signal.

10. The apparatus of claim 9, further comprising:
a first plurality of configurable resistances coupled between the first plurality of mixers and the capacitor, at least one configurable resistance of the first plurality of configurable resistances coupled between each of the first plurality of mixers and the capacitor; and
a second plurality of configurable resistances coupled between the second plurality of mixers and the capacitor, at least one configurable resistance of the second plurality of configurable resistances coupled between each of the second plurality of mixers and the capacitor,
wherein a first combined resistance of:
a first configurable resistance coupled to a first mixer of the first plurality of mixers configured to receive a first oscillating signal of the plurality of oscillating signals having a first phase and a second configurable resistance coupled to a first mixer of the second plurality of mixers configured to receive a second oscillating signal having the first phase has substantially a same value as a second combined resistance of:
a third configurable resistance coupled to a second mixer of the first plurality of mixers configured to receive a third oscillating signal of the plurality of oscillating signals having a second phase and a fourth configurable resistance coupled to a second mixer of the second plurality of mixers configured to receive a fourth oscillating signal having the second phase.

11. A method, comprising:
applying a radio frequency (RF) input signal to a first plurality of mixers and a second plurality of mixers through a shared capacitor;
applying a plurality of oscillating signals to the first plurality of mixers, wherein each mixer of the first plurality of mixers is coupled to two oscillating signals of the plurality of oscillating signals that are 180 degrees apart in phase; and
applying the plurality of oscillating signals to a second plurality of mixers, wherein each mixer of the second plurality of mixers is coupled to two oscillating signals of the plurality of oscillating signals that are 180 degrees apart in phase,
wherein a combined load of the first plurality of mixers and the second plurality of mixers on the plurality of oscillating signals is symmetric as to each oscillating signal of the plurality of oscillating signals.

12. The method of claim 11, further comprising:
applying a first configurable resistance between the shared capacitor and the first plurality of mixers; and
applying a second configurable resistance between the shared capacitor and the second plurality of mixers.

13. The method of claim 12, wherein:
applying the first configurable resistance comprises applying a first plurality of configurable resistances between the shared capacitor and the first plurality of mixers, and
applying the second configurable resistance comprises applying a second plurality of configurable resistances between the shared capacitor and the second plurality of mixers.

14. The method of claim 13, further comprising controlling the first plurality of configurable resistances and the second plurality of configurable resistances based on a band configuration of an antenna receiving the RF input signal.

15. The method of claim 14, wherein controlling the first plurality of configurable resistances and the second plurality of configurable resistances comprises:
adjusting the first plurality of configurable resistances and the second plurality of configurable resistances to set a ratio of a first current through the first configurable resistance to an active mixer of the first plurality of mixers to a second current through the second configurable resistance to an active mixer of the second plurality of mixers, wherein the ratio of the first current to the second current is between 1 and 3.

16. The method of claim 14, wherein controlling the first plurality of configurable resistances and the second plurality of configurable resistances comprises providing resistance scaling of the RF input signal independent of a source impedance of the RF input signal.

17. The method of claim 16, further comprising controlling a radio frequency front end (RFFE) to operate in one of a plurality of modes, wherein controlling the first plurality of configurable resistances and the second plurality of configurable resistances is independent of control of a mode of the RFFE.

18. The method of claim 17, wherein the plurality of modes comprises mixer-first mode and low-noise amplifier (LNA) bypass mode.

19. The method of claim 11, wherein the combined load on each oscillating signal is four transistors comprising two transistors of a first mixer of the first plurality of mixers and two transistors of a second mixer of the second plurality of mixers.

20. The method of claim 11, further comprising:
generating an I-channel baseband signal based on the first plurality of mixers; and generating a Q-channel baseband signal based on the second plurality of mixers.

\* \* \* \* \*